United States Patent
Ware et al.

(10) Patent No.: US 7,263,149 B2
(45) Date of Patent: *Aug. 28, 2007

(54) APPARATUS AND METHOD FOR GENERATING A DISTRIBUTED CLOCK SIGNAL

(75) Inventors: Frederick A. Ware, Los Altos Hills, CA (US); Kevin S. Donnelly, San Francisco, CA (US); Ely K. Tsern, Los Altos, CA (US); Srinivas Nimmagadda, Santa Clara, CA (US)

(73) Assignee: Rambus Inc., Los Altos, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/985,490

(22) Filed: Nov. 10, 2004

(65) Prior Publication Data

US 2005/0063502 A1  Mar. 24, 2005

Related U.S. Application Data

(60) Continuation of application No. 10/091,979, filed on Mar. 4, 2002, now Pat. No. 6,836,521, which is a division of application No. 09/169,589, filed on Oct. 9, 1998, now Pat. No. 6,396,887.

(60) Provisional application No. 60/062,035, filed on Oct. 10, 1997.

(51) Int. Cl.
*H04L 7/00* (2006.01)

(52) U.S. Cl. .................... 375/354; 375/371; 327/144

(58) Field of Classification Search ............. 375/354, 375/356, 359–360, 371–373, 376; 370/503, 370/516; 327/141, 144, 162; 710/58, 60, 710/61; 713/400, 503, 600
See application file for complete search history.

(56) References Cited

U.S. PATENT DOCUMENTS

| | | | | |
|---|---|---|---|---|
| 4,088,959 A | * | 5/1978 | Sumi | 455/180.1 |
| 4,121,162 A | * | 10/1978 | Alberkrack et al. | 455/180.1 |
| 4,377,871 A | * | 3/1983 | Borras et al. | 455/76 |
| 4,563,657 A | * | 1/1986 | Qureshi et al. | 331/25 |
| 4,625,180 A | * | 11/1986 | Itaya et al. | 331/2 |
| 5,018,170 A | * | 5/1991 | Wilson | 375/376 |
| 5,087,829 A | * | 2/1992 | Ishibashi et al. | 327/152 |
| 5,095,536 A | * | 3/1992 | Loper | 455/324 |
| 5,122,677 A | * | 6/1992 | Sato | 327/99 |
| 5,179,730 A | * | 1/1993 | Loper | 455/266 |

(Continued)

FOREIGN PATENT DOCUMENTS

| | | |
|---|---|---|
| EP | 0 666 541 A1 | 8/1995 |
| EP | 0 678 990 A2 | 10/1995 |
| EP | 0 798 630 A1 | 10/1997 |

*Primary Examiner*—Jean B. Corrielus
(74) *Attorney, Agent, or Firm*—Morgan, Lewis & Bockius LLP

(57) ABSTRACT

The present invention provides a method and apparatus for synchronizing signal transfers between two clock domains, where the clock domains have a gear ratio relationship. A gear ratio means that the clocks are related by a ratio, such that each clock has a different integer number of clock cycles in a common period. Also, in addition to a gear ratio relationship, the clocks may have a synchronized edge at the end of the common period. For each clock, the cycles in the common period are "colored", i.e., identified by a number (1st, 2nd, etc.). By using the coloring technique, the appropriate clock edge to perform a data or control signal transfer can be identified. The edges are preferably chosen to minimize the latency of the transfer.

21 Claims, 21 Drawing Sheets

U.S. PATENT DOCUMENTS

| | | | |
|---|---|---|---|
| 5,181,191 A | 1/1993 | Farwell | 368/113 |
| 5,235,292 A * | 8/1993 | Endo et al. | 331/49 |
| 5,291,529 A | 3/1994 | Crook et al. | 375/358 |
| 5,373,254 A * | 12/1994 | Nakauchi et al. | 331/1 A |
| 5,471,587 A | 11/1995 | Fernando | 710/307 |
| 5,509,038 A | 4/1996 | Wicki | 375/371 |
| 5,548,620 A | 8/1996 | Rogers | 375/354 |
| 5,694,066 A | 12/1997 | Shyong | 327/113 |
| 5,790,942 A * | 8/1998 | Le Corre et al. | 455/112 |
| 5,875,219 A * | 2/1999 | Kim | 375/376 |
| 5,909,563 A | 6/1999 | Jacobs | 710/305 |
| 5,964,880 A * | 10/1999 | Liu et al. | 713/401 |
| 5,990,719 A * | 11/1999 | Dai et al. | 327/244 |
| 6,128,749 A | 10/2000 | McDonnell et al. | 713/600 |

* cited by examiner

APPARATUS AND METHOD FOR GENERATING A DISTRIBUTED CLOCK SIGNAL

RELATED APPLICATIONS

This application is a continuation of U.S. patent application Ser. No. 10/091,979, filed Mar. 4, 2002, now U.S. Pat. No. 6,836,521, which is a divisional of U.S. patent application Ser. No. 09/169,589, filed Oct. 9, 1998, now U.S. Pat. No. 6,396,887, which claims priority to U.S. Provisional Patent Application No. 60/062,035, filed on Oct. 10, 1997, all of which are incorporated herein by reference.

TECHNICAL FIELD

The present invention relates to electronic circuits and the field of distributed clock circuits. More particularly, the present invention relates to a method and circuit for synchronizing clock signals from separate clock domains with minimized latency.

BACKGROUND

The demands created by today's high-speed electronic equipment have generated a number of problems for circuit designers and manufacturers. For example, many applications require that two subsystems running at different frequencies communicate with each other. Generally, logic running at a given clock frequency is said to be operating in a clock domain.

This synchronization problem has been previously addressed either by eliminating one of the clock domains or by adding synchronization logic. Unfortunately, the synchronization logic adds unwanted latency due to the additional circuitry. Moreover, the disparity between the clock domains may include different frequencies and/or phases, further complicating the synchronization circuit design and adding to the latency. Alternatively, eliminating one of the clock domains is not always feasible because there are practical limitations as to how many components a single clock source may support. Also a single clock domain will limit the independent optimization of each subsystem.

An example of a system with two clock domains is a memory subsystem that contains a memory clock domain and a controller clock domain. As stated above, the simplest solution to the clock domain problem is to ensure that a system only has one clock domain.

FIG. 1 shows a prior art system that contains only one clock domain. A clock source CLKSOURCE 102 uses a crystal 104 to generate a high-frequency clock, BUSCLK 106. In this example, BUSCLK 106 is shown traveling past a controller CTRL_A 108 to a termination resistor 110. The use of terminated transmission lines is common place in high-speed clock distribution, but is not required for this discussion.

In FIG. 1, BUSCLK 106 is buffered by buffers 112, inside controller 108. The use of buffers is common practice, but not required. Finally, the buffered version of BUSCLK 106 drives a clock divider C 114 which divides BUSCLK 106 to generate a clock called SYNCLK 116. The divider could have any value, including one (i.e., SYNCLK=BUSCLK).

A key aspect of FIG. 1 is that all of the logic in controller 108 runs off the same SYNCLK 116. SYNCLK 116 is buffered by buffers 117 and output from the controller 108 to drive the rest of the system as the system clock, SCLK_A 118. Since all of the control logic and the entire system run off a clock derived from SYNCLK 116, there are no clock domains to cross and no asynchronous data transfers required. However, it is very restrictive to require an entire system to run off one clock domain, and this approach is not practical for most systems. For example, running the system using one clock signal will result in each subsystem not being optimized to its fullest potential. Hence, each subsystem will, instead, be restricted by the limitations posed by a different subsystem.

FIG. 2 illustrates a more common approach. Elements appearing in FIG. 2, which were introduced in FIG. 1, are referred to with the same reference numerals which were originally used. In FIG. 2, CLKSOURCE 102 generates BUSCLK 106, which is divided to generate SYNCLK 116. However, in FIG. 2 a separate clock source MAIN CLK SRC 208 generates a second clock, SCLK_B 210, which is used by the rest of the system. SCLK_B 210 is buffered by buffers 211 to generate PCLK_B 212, inside CTRL_B 214. Alternately, SCLK_B 210 could be divided or multiplied to generate PCLK_B 212. After the clocks are generated, there are two clock domains, that of PCLK_B 212 and that of SYNCLK 116, between which data needs to be exchanged.

Because PCLK_B 212 and SYNCLK 116 are asynchronous, data cannot be exchanged directly from logic running in one clock domain to logic running in the other clock domain without losing data. Instead, data needs to be synchronized as it is passed between the two clock domains. For example, in FIG. 2, FIFOs 216 are shown which are driven by both PCLK_B 212 and SYNCLK 116 to synchronize data that is transferred between the domain of PCLK_B 212 and the domain of SYNCLK 116. While this synchronization is effective in solving some of the clock domain crossing problems, it adds additional latency to the data transfer.

For example, when two clock domains are asynchronous (no frequency or phase relationship), blocks of information are typically transferred with dual port memories. Data is written into a memory from one clock domain and read from the memory by the other clock domain. A second memory is needed for communication in the reverse direction. Control signals coordinate these empty-fill operations. The control signals are often double-sampled with registers in each clock domain to avoid metastability problems. This solution is robust, but typically has a significant latency cost because of the synchronization delay. Additionally, it can have a bandwidth cost if the empty-fill operations can not be overlapped because of synchronization overhead.

In view of the foregoing, it would be highly desirable to synchronize clocks from different clock domains, for example in a memory system, while minimizing any latency caused by the additional synchronization circuitry.

SUMMARY OF THE INVENTION

The present invention provides a method and apparatus for synchronizing signal transfers between two clock domains, where the clock domains have a gear ratio relationship. A gear ratio means that the clocks are related by a ratio, such that each clock has a different integer number of clock cycles in a common period. Also, in addition to a gear ratio relationship, the clocks may have a synchronized edge at the end of the common period. For each clock, the cycles in the common period are "colored", i.e., identified by a number (1st, 2nd, etc.). By using the coloring technique, the appropriate clock edge to perform a data or control signal transfer can be identified. The edges are preferably chosen to minimize the latency of the transfer.

In one embodiment, after a clock edge of the faster clock strobing the data into a buffer, the appropriate clock edge of the slower clock to strobe out the data is the next rising clock edge of the slower clock in the common period. This relationship results in only some of the fast clock edges being used for strobing data in, but all of the slow clock edges being used for strobing data out.

Conversely, for data transfers from the slow clock domain to the fast clock domain, the invention preferably uses the latest fast clock rising edge after a slow clock rising edge strobing in the data from the slow clock domain, but before the next slow clock rising edge strobing in the next data. Although the next fast clock edge could be used, since there are more fast clock edges than are needed for maximum slow clock bandwidth, the latest clock is chosen to maximize the data setup time.

The invention can be applied to different clock ratios by appropriately varying the color code (number of cycles in the common period) and by varying which color value is used for the strobing. Thus, by simply programming registers, for example, with new color values and new selected color values for transfers, the same physical hardware can accommodate many different gear ratio clocks.

In yet another embodiment, the present invention provides a method and apparatus for a distributed clock generation loop which generates clock signals that allow asynchronous data transfers between different clock domains with minimized latency. This aspect is helpful, in part, because even if two clocks are related by a gear ratio, there is no inherent phase relationship between their phases. The distributed loop comprises at least one clock divider, a phase detector, and a variable delay element (phase aligner). For example, clock dividers are used to divide down the clocks that define the clock domains to a common frequency. The divided clocks drive a phase detector, which drives a phase aligner. The distributed loop shifts the phase of one of the divided clocks to align it with the other divided clock. When the divided clocks are phase aligned by the distributed loop, the original clocks will have edges which are also phase aligned. Data can then be transferred at the aligned clock edges without incurring additional latency for synchronization.

In one embodiment, in order to reduce power consumption in a low power mode, the output of a clock generator is disabled without disabling the clock generator in its entirety. This eliminates the power required to drive the load on the clock line, while avoiding frequency and phase drift, thus eliminating the latency normally required to re-acquire frequency and phase lock when coming out of a low power mode. This is accomplished by separating the phase alignment feedback and frequency lock feedback in one embodiment.

In addition, multiple clock domains are provided in one embodiment, which are separately synchronized. This, for example, allows clock domains not in use to be powered down. Also, simultaneous synchronization among multiple clock domains will permit transfers between more than two clock domains at the same time.

Therefore, the invention allows for synchronization of different clock domains, while minimizing the amount of latency resulting from any additional synchronization latency. A further understanding of the nature and advantages of the present invention may be realized by reference to the latter portion of the specification and attached drawings.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DESCRIPTION OF THE PREFERRED EMBODIMENTS

One aspect of the present invention applies where the clock periods (or frequencies) of two domains of digital logic have a fixed ratio. When this relationship holds, the two domains are said to be operating in a gear ratio fashion. Therefore, two clocks can be said to have a gear ratio when an integer multiple of the first clock's period equals the same amount of time as an integer multiple of the second clock's period. For example, two clocks have a 4/3 gear ratio if four cycles of the first clock equal three cycles of the second clock.

Figure 1:
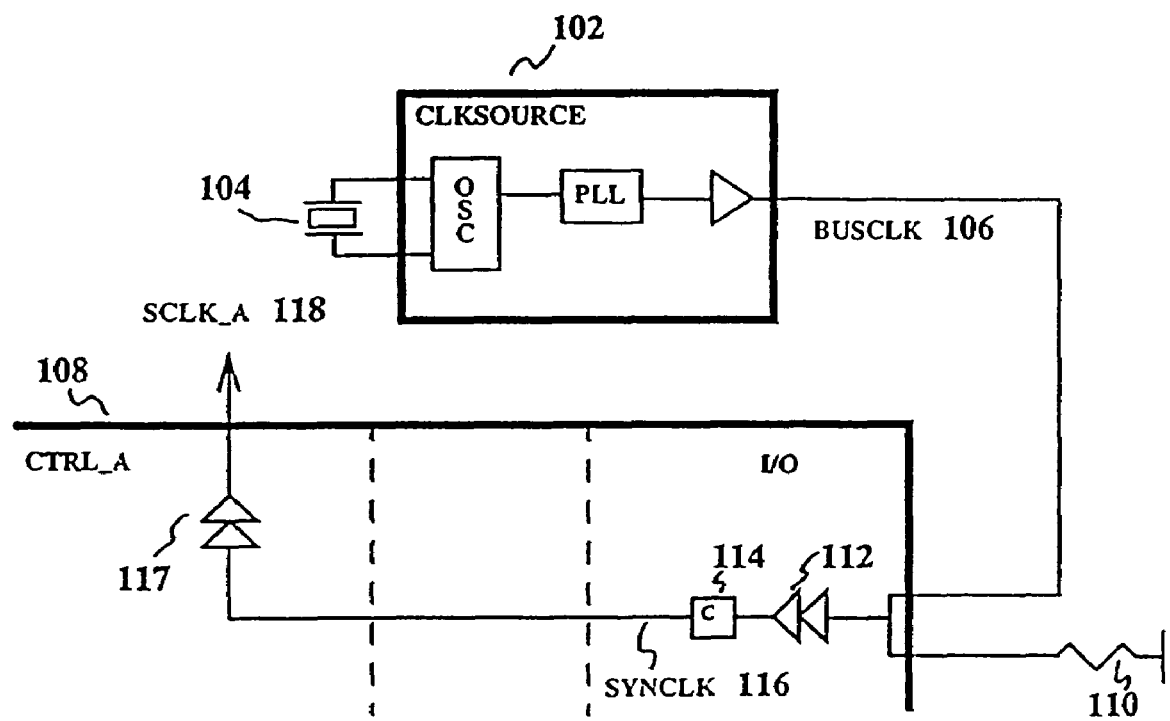
FIG. 1 is a block diagram of a prior art single clock system architecture.
Figure 2:
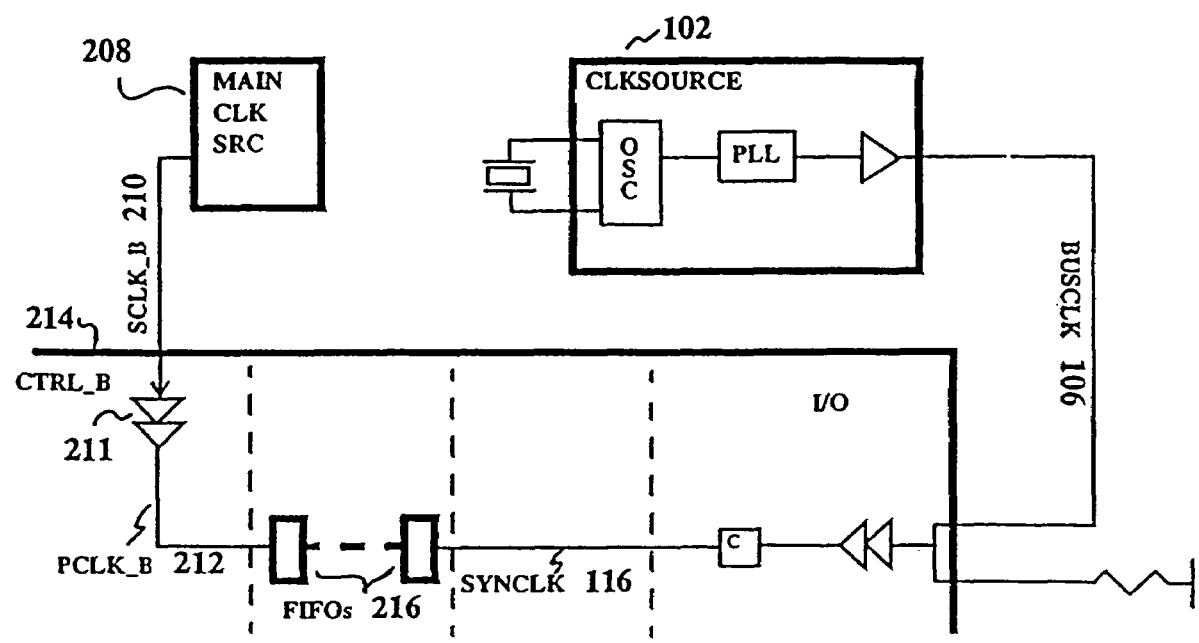
FIG. 2 is a block diagram of an alternate prior art system clock architecture.
Figure 3:
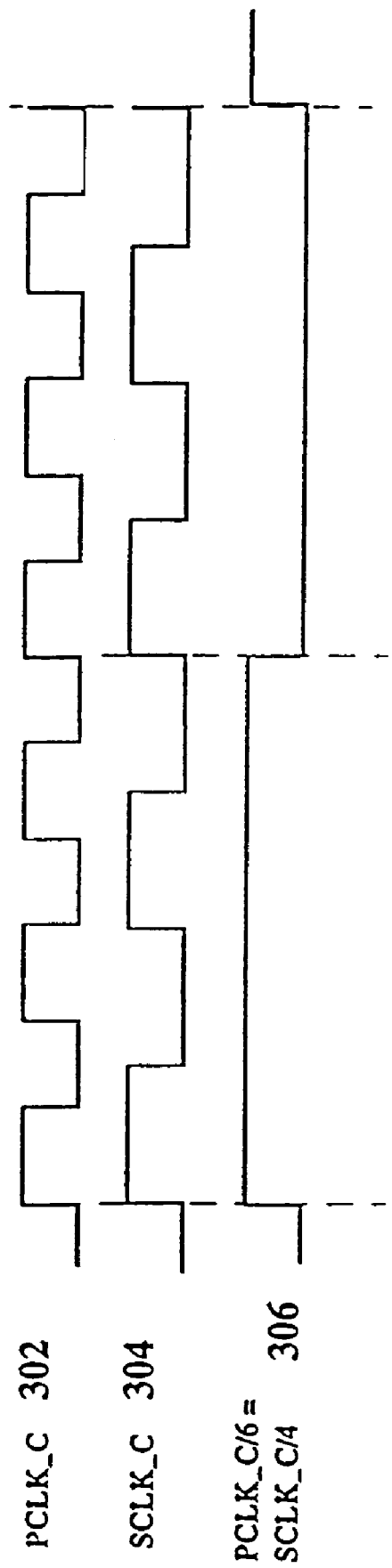
FIG. 3 shows the clock waveforms of an example gear ratio relationship.

FIG. 3 shows the clock waveforms of an example gear ratio where three cycles of clock PCLK_C 302 equal two cycles of clock SCLK_C 304, or 3* (cycle of PCLK_C)=2* (cycle of SCLK_C). In FIG. 3, PCLK_C 302 and SCLK_C 304 are phase aligned at the end of the common period, for example by being generated from the same crystal. Since gear ratio is defined as the ratio of the two clock frequencies, in the above example the gear ratio of PCLK_C/SCLK_C is 3/2. If clock signals PCLK_C 302 and SCLK_C 304 are divided by 6 and 4, respectively, a clock signal 306 will result which is equal to both PCLK_C/6 or SCLK_C/4.

Figure 4:
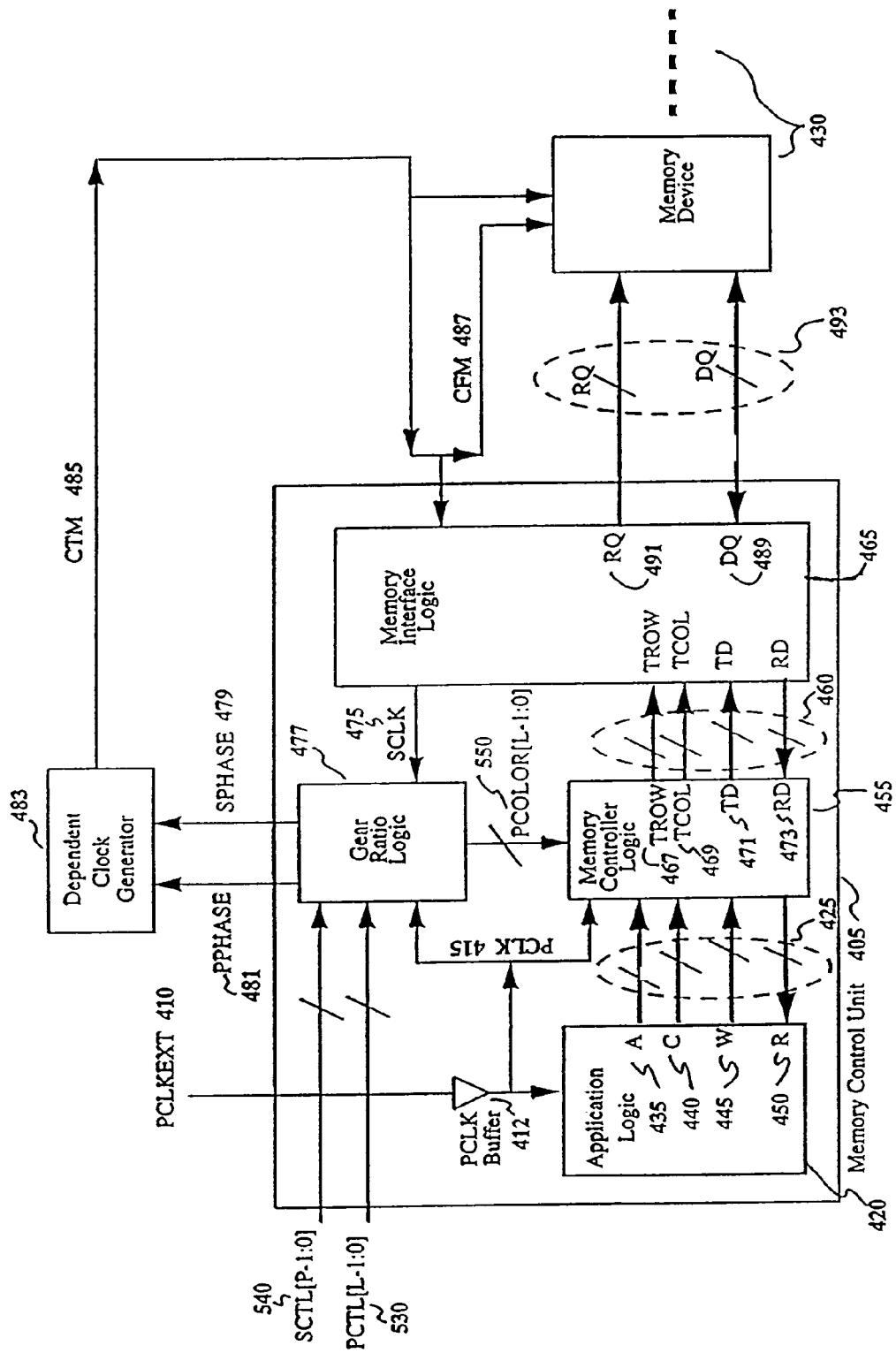
FIG. 4 is a block diagram of a memory system with two clock domains.

FIG. 4 shows a block diagram of a digital system with two clock domains operating in gear ratio fashion. The digital system is a Memory Control Unit 405. An external clock signal PCLKEXT 410 supplies a clock signal PCLK 415 through buffers 412 to an Application Logic block 420 inside Memory Control Unit 405.

A set of signals 425 are developed within the domain of PCLK 415. The "/" symbol on each of the lines indicates that the signal may be a single line or a bus. On each edge of PCLK 415, signals and buses 425 communicate all the information needed to initiate a memory transaction (read or write operation) in memory devices 430. Signal A 435 contains a transaction address. Signal C 440 contains control codes to select options and operations. Signal W 445 contains transaction write data. And, signal R 450 contains transaction read data.

A memory controller 455 also operates in the domain of PCLK 415. It uses a set of buses 460 to communicate with a Memory Interface Logic 465. A signal TROW 467 contains transaction controls and addresses for row operations. A signal TCOL 469 contains transaction controls and addresses for column operations. A signal TD 471 contains transaction write data. A signal RD 473 contains transaction read data. Buses 460 carry the same information as was on buses 425, but in a format that can be directly utilized by memory devices 430.

Memory Interface Logic 465 operates in the domain of SCLK 475. Subsystems of memory devices 430 also (effectively) operate in the domain of SCLK 475. SCLK 475 and PCLK 415 are in a gear ratio relationship. They both drive gear ratio Logic 477, generating signals SPHASE 471 and PPHASE 481, which measure the relative phase of PCLK 415 and SCLK 475. These two phase signals are driven to a Dependent Clock Generator 483. The phase difference is measured and used to drive clock signal CTM 485.

CTM 485 drives a signal CFM 487 for memory devices 430 and ultimately becomes SCLK 475 for Memory Interface Logic 465. The feedback loop from gear ratio Logic 477 through clock generator 483 and Memory Interface Logic 465 allows the phase (and frequency) of SCLK 475 to automatically adjust to a known relationship with PCLK 415. Clock generator 483 could be a component external to Memory Control Unit 405 or, alternatively, a block within it. The first case is shown in FIG. 4.

Signals TROW 467, TCOL 469, TD 471, and RD 473 are converted into DQ 489 and RQ 491 which form bus 493 between Memory Interface Logic 465 and memory devices 430. The details of this format conversion do not affect this disclosure, and will not be discussed further.

Figure 5:
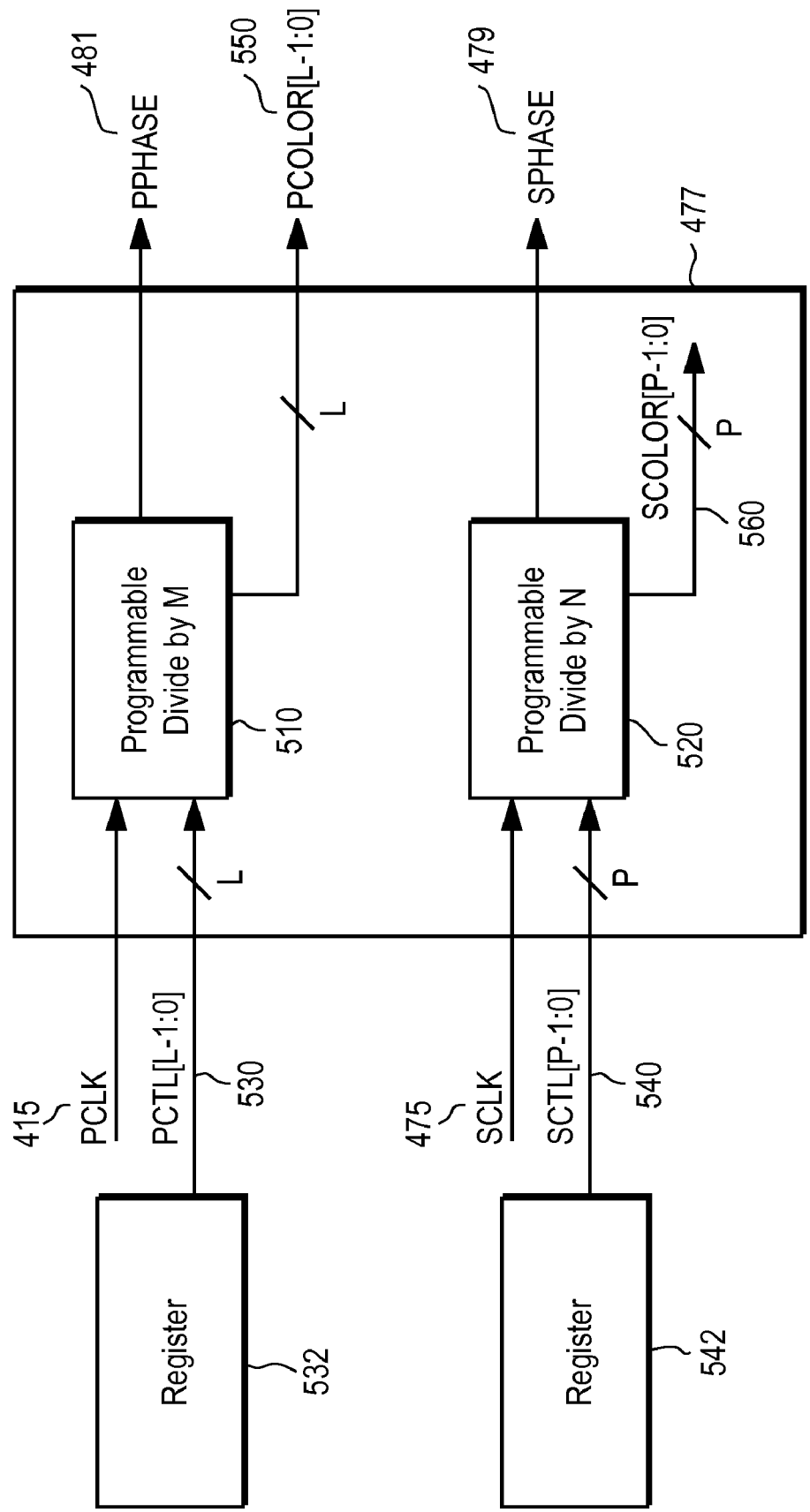
FIG. 5 is a block diagram of an example gear ratio logic block.

FIG. 5 shows an example of details within a gear ratio Logic block 477 of FIG. 4. Elements appearing in FIG. 5 which were introduced in FIG. 4 are referred to with the same reference numerals which were originally used.

In FIG. 5, there are two similar sub-blocks 510 and 520, one for PCLK 415 and one for SCLK 475, respectively. PCLK sub-block 510 divides PCLK 415 by M. Similarly, sub-block 520 divides SCLK 475 by N. The value of M and N specify a desired gear ratio. These values could be, for example, set by initialization registers 532, 542 through PCTL 530 and SCTL 540, respectively. In general, M is double the value of PCTL+1 and N is double the value of SCTL+1. For example, as shown in FIG. 3, a 3/2 gear ratio will require M=6, N=4 PCTL=2, and SCTL=1. PCTL 530 may be up to L wide and SCTL 540 may be up to P wide.

Figure 6:
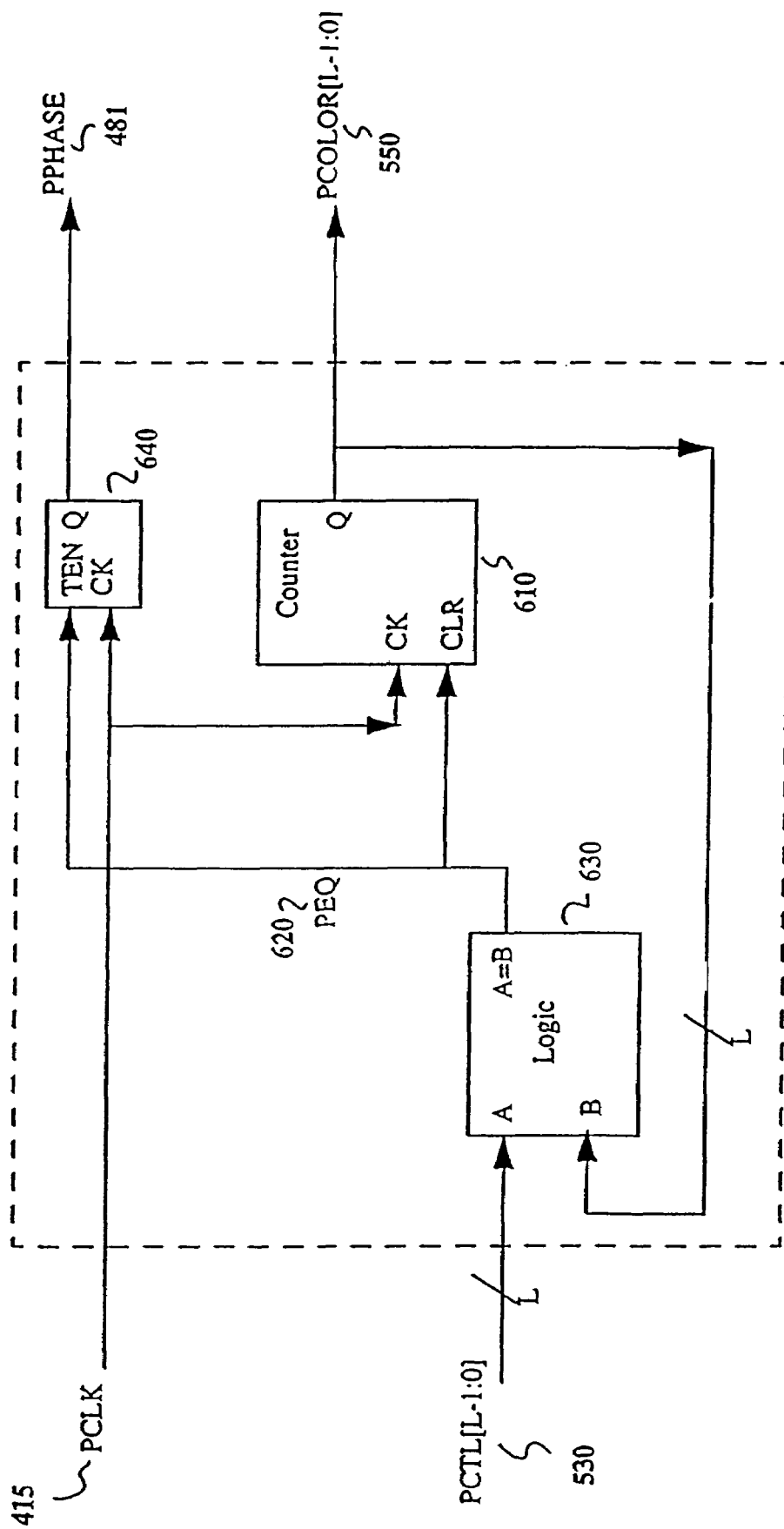
FIG. 6 is a block diagram of an example gear ratio logic sub-block.

FIG. 6 shows an equivalent circuit for sub-block 510 of FIG. 5.

In FIG. 6, counter 610 is incremented on each edge of PCLK 415. Counter 610 is cleared by a signal PEQ 620 whenever a comparator block 630 reaches a maximum value set by PCTL 530. Therefore, the output of counter 610, PCOLOR 550, is incremented on each edge of PCLK 415 until it reaches a maximum value set by PCTL 530.

Also, whenever PEQ 620 is asserted, the value of PPHASE 481 is toggled by a storage block 640. As a result, PPHASE 481 is asserted while counter 610 is counting and toggled each time counter 610 is reset. This process ensures that PPHASE 481 is indicative of the progress of the color coding scheme. As discussed before, color coding ensures data is transferred at correct edges.

Figure 7:
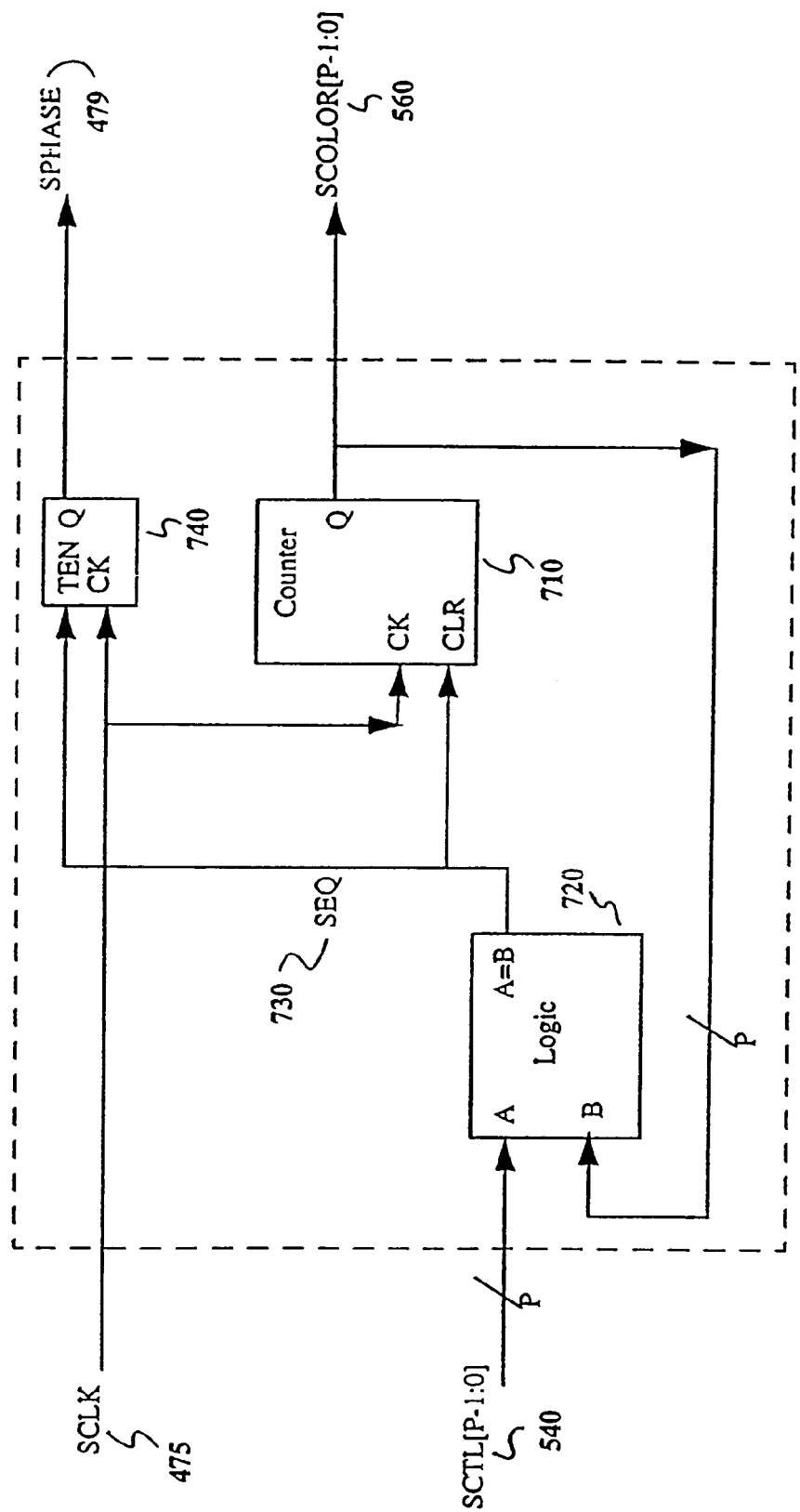
FIG. 7 is a block diagram of an example of a different gear ratio logic sub-block.

FIG. 7 shows an equivalent circuit for sub-block 520 of FIG. 5.

The operation of this circuit is identical to the one of FIG. 6. However, in FIG. 7, a counter 710 is incremented on each edge of SCLK 475 and cleared by comparator 720 whenever a maximum value set by SCTL 540 is reached. Therefore, the output of counter 710, SCOLOR 560, is incremented on each edge of SCLK 475 until it reaches a maximum value set by SCTL 540. Also, whenever SEQ 730 is asserted, the value of SPHASE 479 is toggled by a storage block 740. As a result, in FIG. 7, SPHASE 479 is asserted while counter 710 is counting and toggled when counter 710 is reset. This process ensures that SPHASE 479 is indicative of the progress of the color coding scheme.

Figure 8:
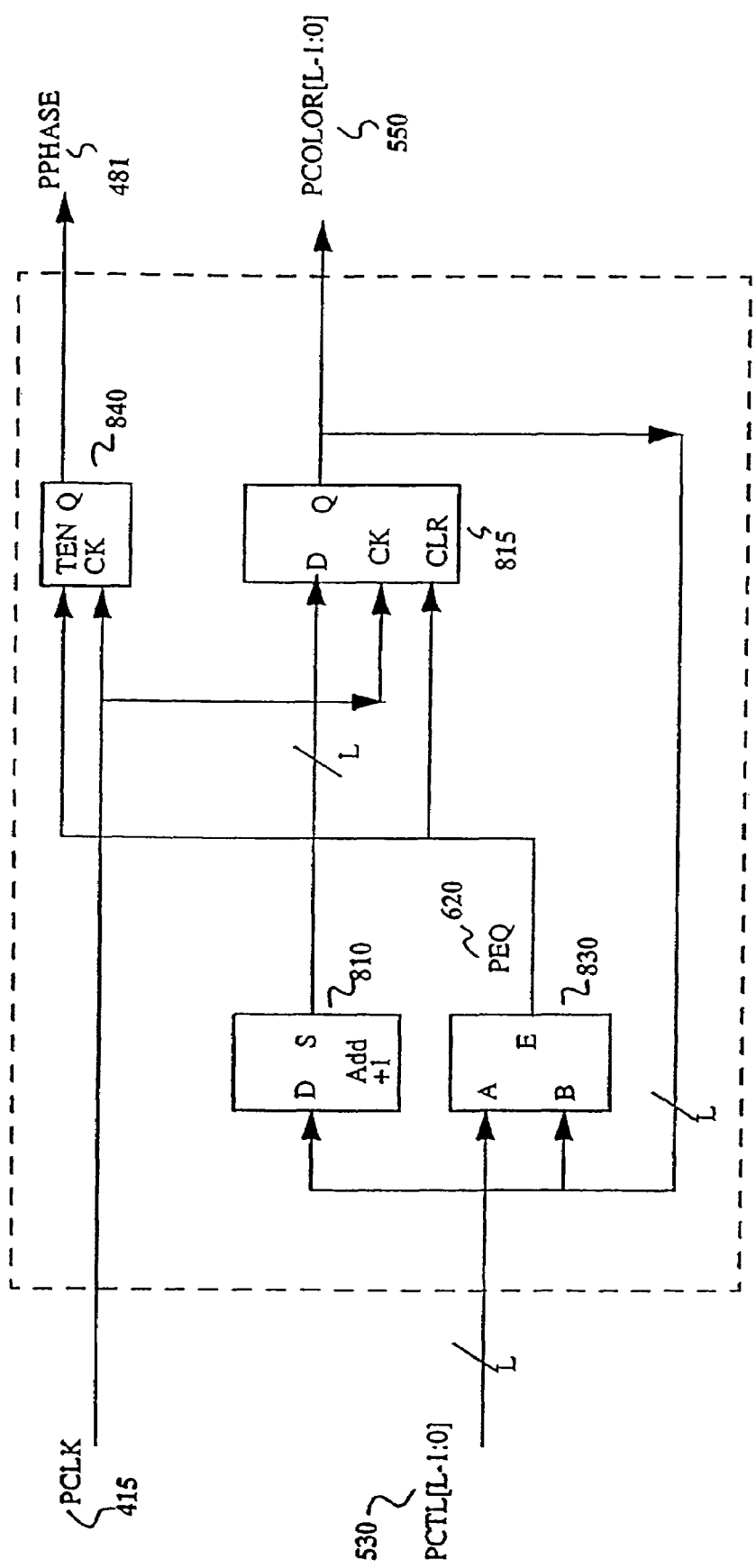
FIG. 8 is a block diagram of an alternate example of a gear ratio logic sub-block.

FIG. 8 shows yet another equivalent circuit for sub-block 510 of FIG. 5. In FIG. 8, counter 610 of FIG. 6 has been replaced with an adder 810 and a storage block 815. PCOLOR 550 is incremented by adder 810 through storage block 815 on each edge of PCLK 415. PCOLOR 550 is cleared by a signal PEQ 820 whenever a comparator block 830 reaches a maximum value set by PCTL 530. Whenever PEQ 620 is asserted, the value of PPHASE 481 is toggled by a storage block 840. This process ensures, that PPHASE 481 is indicative of status of the color coding scheme in progress.

Figure 9:
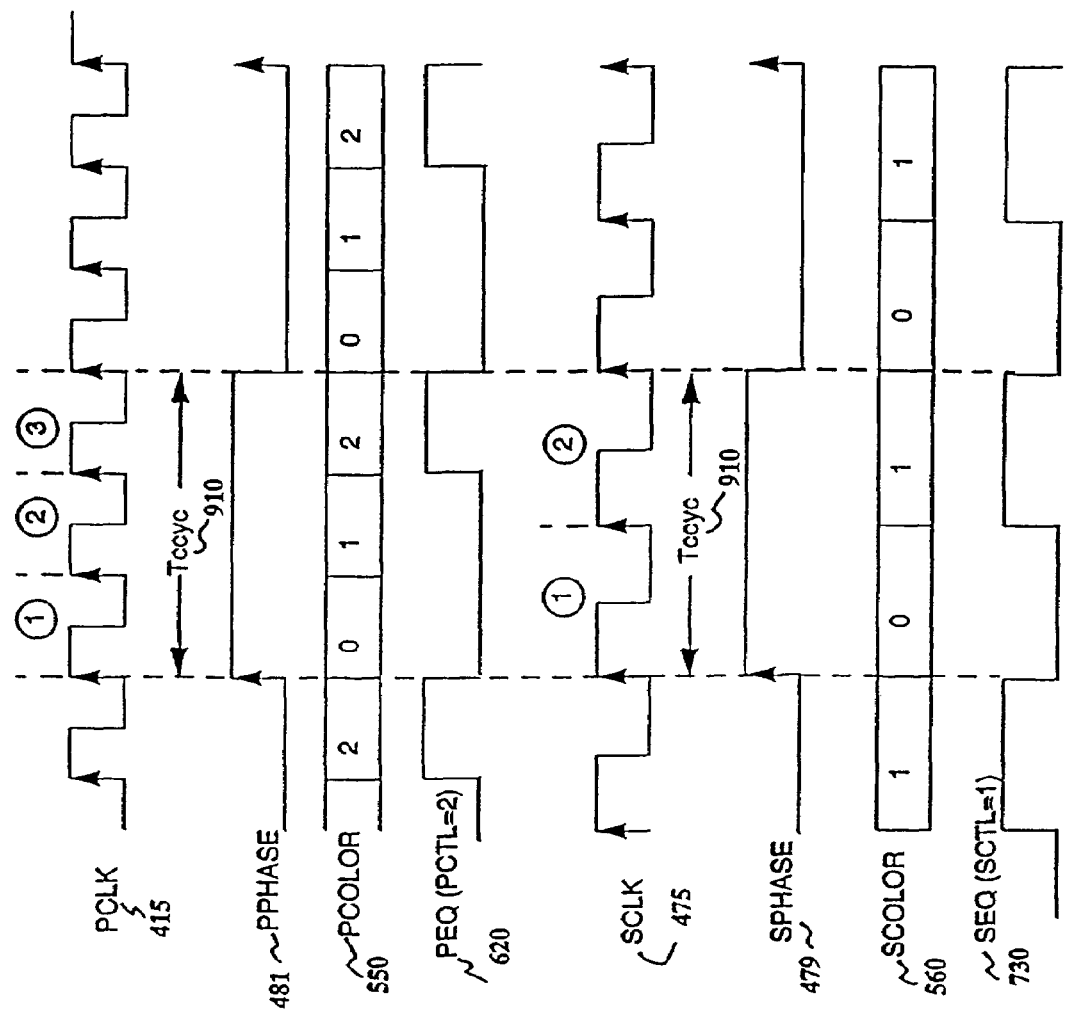
FIG. 9 is a timing diagram of gear ratio logic signals for a 3/2 gear ratio.

FIG. 9 shows a timing diagram of signals associated with gear ratio Logic 477 with a 3/2 gear ratio.

In FIG. 9, the cycle time of SCLK 475 is 3/2 times the cycle time of PCLK 415. PCOLOR 550 is incremented from a value 000 through a value 010 (i.e., 000, 001, 010) on each edge of PCLK 415. When PCOLOR 550 reaches a maximum value 010, PCOLOR 550 clears to 000 and PEQ 620 is asserted. PEQ 620, in turn, toggles the value of PPHASE 481. Therefore, PPHASE signal 481 alternates from O to 1 every three cycles of PCLK 415, or one cycle Tccyc 910

On the other hand, SCOLOR 560 reaches a maximum value of 001, for this example. Once SCOLOR 560 reaches 001, the value of SCOLOR 560 clears to 000 and SEQ 730 is asserted. SEQ 730, in turn, toggles the value of SPHASE 479. Thus, SPHASE 479 alternates from 0 to 1 every two cycles of SCLK 475, or one cycle TCCYC 910.

In a 3/2 embodiment, PCOLOR 550 and SCOLOR 560 indicate the value of counts in progress for PCLK 415 and SCLK 475, respectively. PCOLOR 550 is asserted for three cycles of PCLK 415 (as shown by encircled 1, 2, and 3) and SCOLOR 560 is asserted for two cycles of SCLK 475 (as shown by encircled 1 and 2).

The values of PCOLOR 550 and SCOLOR 560 are used in at least two ways. First, the values of PCOLOR 550 and SCOLOR 560 are used to assert PPHASE 481 and SPHASE 479, respectively, to phase-align, for example, SCLK 475 to PCLK 415 at the proper edges for a given gear ratio configuration. PPHASE 481 and SPHASE 479 are asserted whenever their coloring signals indicate a counting in progress. For example, PPHASE 481 is toggled each time PCOLOR 550 is reset; and, SPHASE 479 is toggled each time SCOLOR 560 is reset. Therefore, PPHASE 481 and SPHASE 479 measure the relative phase of PCLK 415 and SCLK 475. Furthermore, as shown in FIG. 4, PPHASE 481 and SPHASE 479 are driven to a clock generator 483 which drives clock signal CTM 485. Hence, clock CTM 485 will become a phase-aligned clock signal derived from SCLK 475.

Second, the value for PCOLOR 550 is used to indicate when data read and write operations should take place. Further details on the use of PCOLOR 550 are described below with respect to FIG. 10.

Other gear ratios are possible. For example, with two 3-bit color registers, about 64 gear ratio combinations are possible because each register will have eight possible different combinations. However, some of these combinations will be redundant.

Thus, as shown in FIG. 9, if PCLK 415 cycle time is shorter than SCLK 475 cycle time, and if PCLK and SCLK have a known frequency and phase relationship, then there is a systematic process that can be followed, which allows a single memory controller 455 to support a wide range of gear ratios and operate in the domain of PCLK 415.

Figure 10:
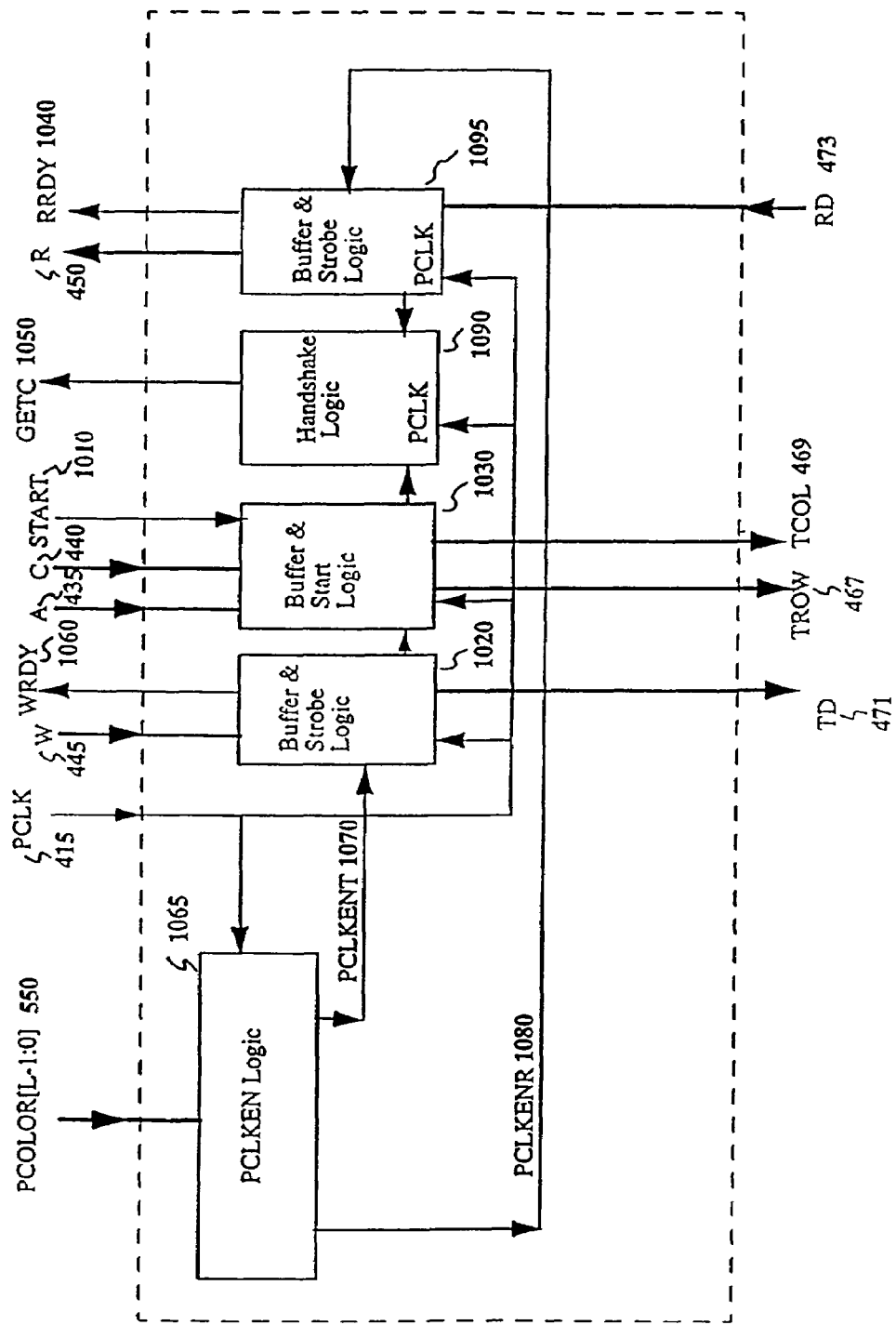
FIG. 10 shows a simplified block diagram of a memory controller logic block.

FIG. 10 shows a simplified block diagram of memory controller 455 of FIG. 4. There are five buffer and logic blocks which have been designed to operate at PCLK 415 frequency. As shown, W 445, A 435, C 440, and START 1010 inputs are accepted by blocks 1020 and 1030. These inputs are used with current values stored in these blocks to produce TD 471, TROW 467, TCOL 469, RRDY 1040, GETC 1050, and WRDY 1060. START 1010 is a handshake signal indicating a valid value of A 435 and C 440. RRDY 1040 is a strobe signal indicating a valid value of R 450. GETC 1050 is a handshake signal indicating that the contents of A 435, C 440, and W 445 are accepted. And, WRDY 1060 is a strobe signal indicating a valid value of W 445. These signals are used together to perform a read or write operation in memory controller 455.

A PCLKEN Logic 1065 uses PCOLOR 550 to develop two signals, PCLKENT 1070 and PCLKENR 1080. PCLKENT 1070 is applied to blocks 1020, 1030, and 1090 to indicate that a write transfer is enabled. For example, when PCLKENT 1070 is a one, the value of blocks 1020 and 1030 are updated with new input values. Conversely, when PCLKENT 1070 is zero, the current value of buffers 1020 and 1030 are recirculated.

Moreover, enable signal PCLKENR 1080 is also developed by PCLKEN Logic 1065. PCLKENR 1080 is also applied to blocks 1095 and 1090 to indicate that a read transfer is enabled. When PCLKENR 1080 is a one, the value of buffer 1095 is updated. Conversely, a zero value of PCLKENR 1080 results in recirculating the current values stored in buffer 1095.

Figure 11:
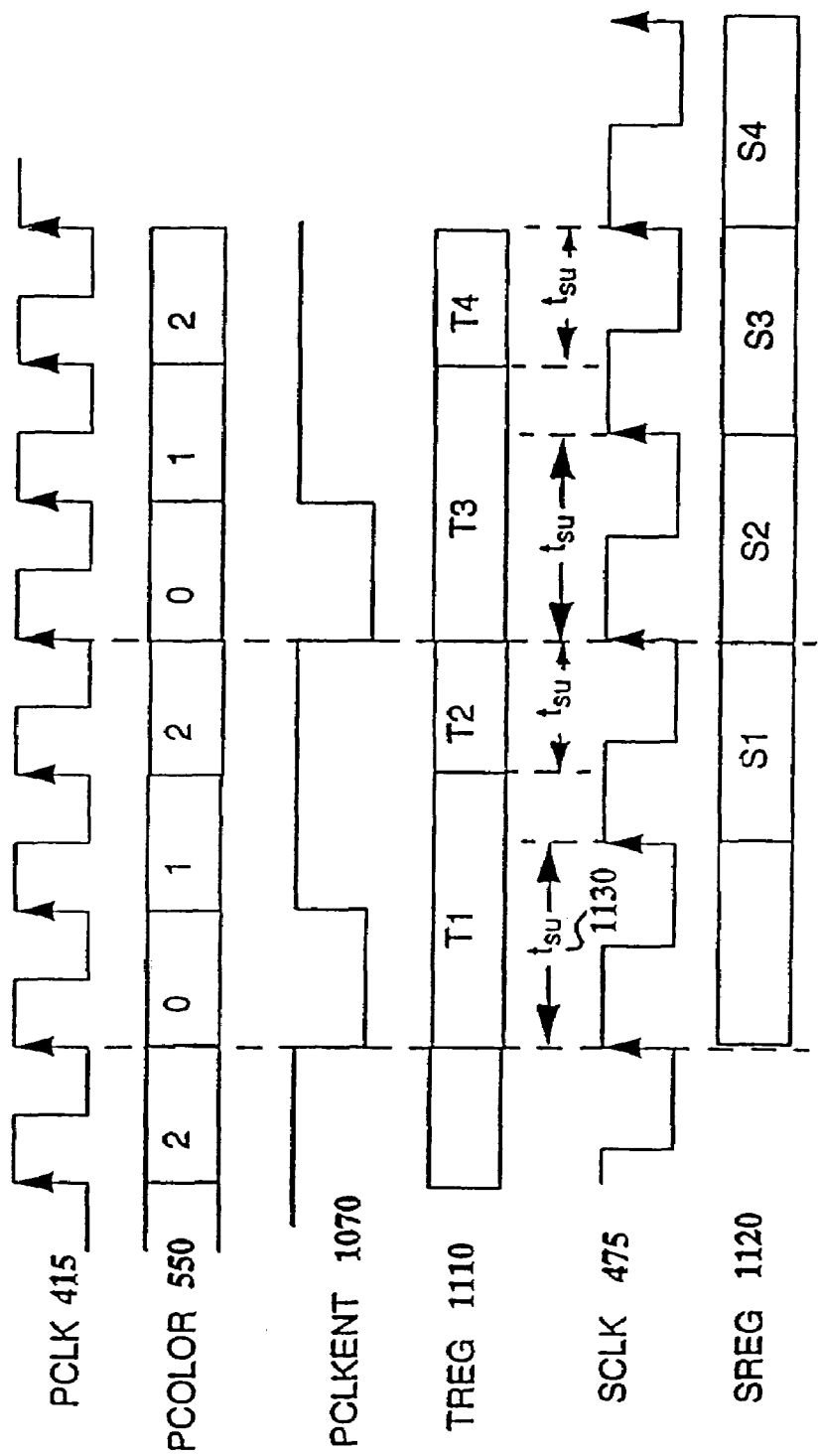
FIG. 11 shows a timing diagram for transfers in the write direction for a 3/2 gear ratio example.

FIG. 11 shows a timing diagram for transfers from the domain of PCLK 415 to the domain of SCLK 475, using a 3/2 gear ratio. In FIG. 11, signal PCLKENT 1070 is asserted when the value of PCOLOR 550 is 001 or 010; and, is toggled off when the value is 000. As a result, the value of PCLKENT 1070 indicates when data may be transferred from the domain of PCLK 415 to the domain of SCLK 475.

A signal TREG 1110 is a simplified representation for the values of signals TD 471, TROW 467, and TCOL 469. As shown, due to the state of PCLKENT 1070, TREG 1110 will keep its value (i.e. T1, T2, T3, and T4) for either one or two cycles of PCLK 415. The setup time for transfer of the data contained in TREG 1110 is shown by a corresponding tSu in FIG. 11. For example, tSu 1130 is the setup time for transferring T1 from the domain of PCLK 415 to the domain of SCLK 475.

Data, then, is read into Memory Interface Logic 465, represented by a signal SREG 1120, from a rising edge of PCLK 415 to the next rising edge of SCLK 475. This means that when the signals of TREG 1110 are sampled by Memory Interface Logic 465 on a rising edge of SCLK 475, there will be either one cycle of PCLK 415 or SCLK 475 for the data to be driven from the domain of PCLK 415 and to be received by the domain of SCLK 475.

Consequently, as long as the cycles of PCLK 415 or SCLK 475, gated by PCLKENT 1070, are used, the result will be the same when counting intervals for tracking the progress of a transaction through memory devices 430. In accordance with the color coding scheme utilized, PCLKENT 1070, being derived from PCOLOR 550, will indicate at what clock edges data may be reliably transferred from the domain of PCLK 415 to the domain of SCLK 475. This is important because it means that the logic needs to be designed and optimized just once. All that may need to be changed is the color coding scheme to achieve a more optimized result for a given gear ratio.

Thus, the logic can be used with any gear ratio combination as long as the cycle time of PCLK 415 is shorter than the cycle time of SCLK 475. This last restriction is needed because it is assumed that memory controller 455 needs to produce information on every edge of SCLK 475 for Memory Interface Logic 465 to keep memory devices 430 active at all times. This is the case because, as a practical matter, most memory devices 430 are slower than components in the domain of PCLK 415. Since memory devices such as 430 take more time to finish a given operation, they may need to be active for longer periods to keep up with the rest of the circuitry.

In a similar fashion to PCLKENT 1070, signal PCLKENR 1080 is needed for communication from the domain of SCLK 475 to the domain of PCLK 415. The only information flowing in this direction is the read data.

Figure 12:
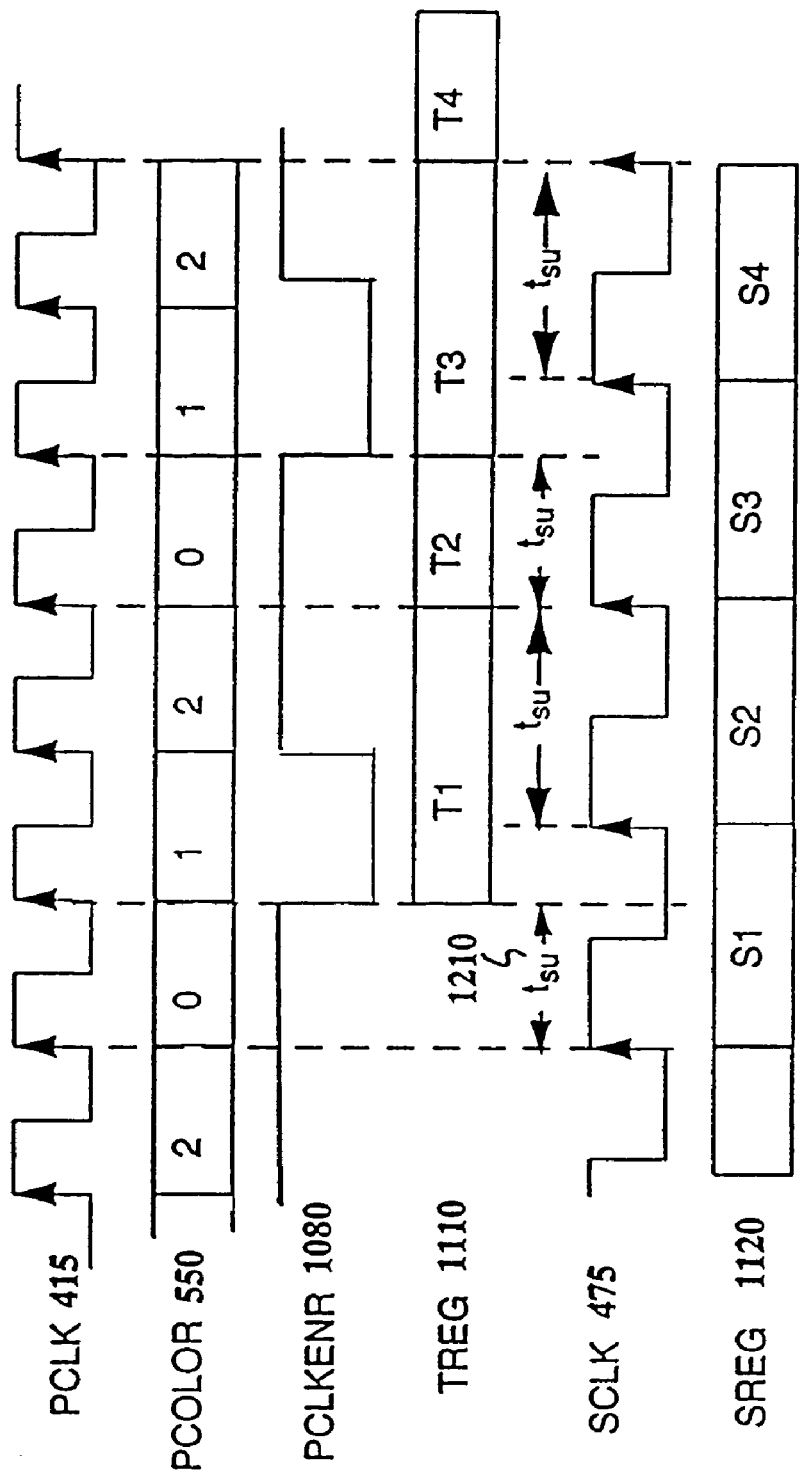
FIG. 12 shows a timing diagram for transfers in the read direction for a 3/2 gear ratio example.

FIG. 12 shows a timing diagram for transfers from the domain of SCLK 475 to the domain of PCLK 415, using a 3/2 gear ratio. PCLKENR 1080 is asserted whenever the value of PCOLOR 550 is 000 or 010, and toggled off when the value of PCOLOR 550 is 001. Read data is driven by memory devices 430 through Memory Interface Logic 465. In this embodiment, signal PCLKENR 1080 uses the value of PCOLOR 550 to ensure that as much time as possible is available for crossings from the domain of SCLK 475 to the domain of PCLK 415.

As shown in FIG. 12, there will be either one cycle of PCLK 415 (i.e., for S1) or one cycle of SCLK 475 (i.e., for S2) available to drive the read data from the domain of SCLK 475. The setup time for transfer of each value of SREG 1120 is shown by a corresponding tSU in FIG. 12. For example, tSU 1210 is the setup time for transferring the S1 data. Data is then read into memory controller 455 on selected edges of PCLK 415. For example, S1 is read from a rising edge of SCLK 475 to the next rising edge of PCLK 415 and S2 is read from a rising edge of SCLK to the second following rising edge of PCLK 415.

Figure 13:
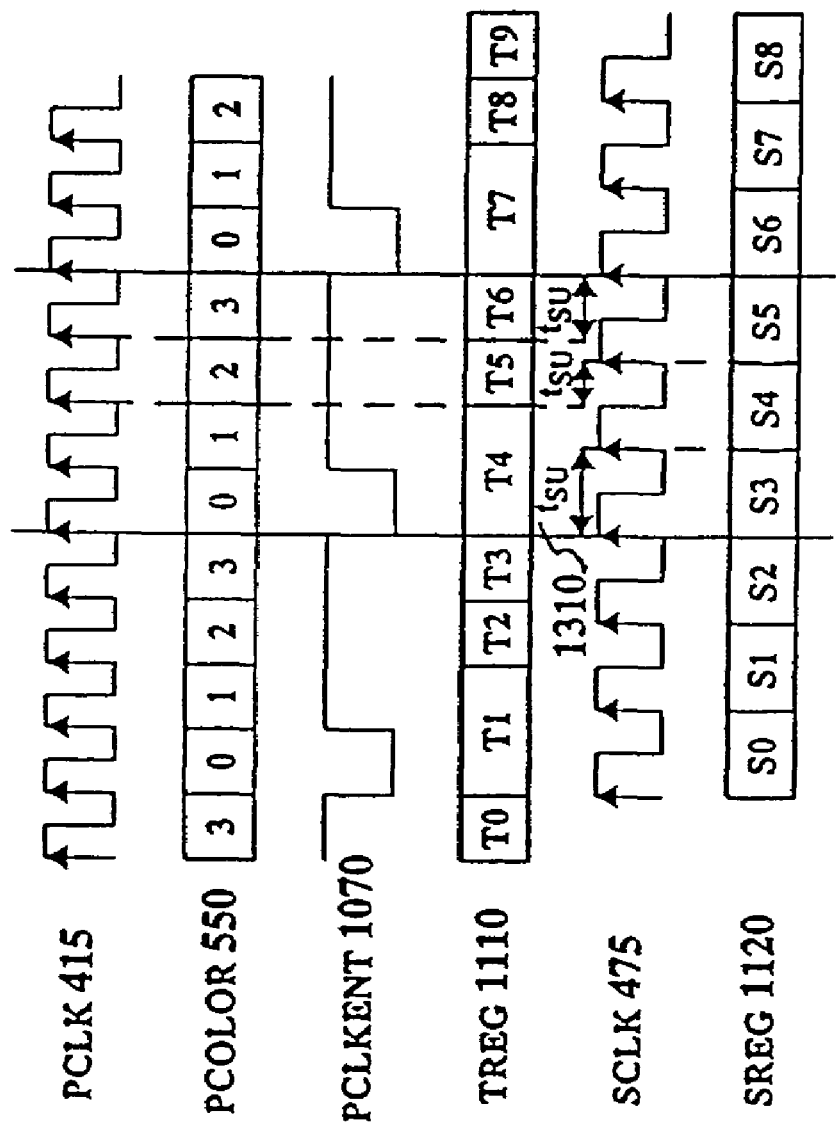
FIG. 13 shows a timing diagram for transfers in the write direction for a 4/3 gear ratio example.

FIG. 13 shows a timing diagram for transfers from the domain of PCLK 415 to the domain of SCLK 475, using a 4/3 gear ratio. In FIG. 13, PCOLOR 550 cycles through four values (i.e., 000, 001, 010, and 011). For PCLKENT 1070, the value 000 of PCOLOR 550 is not used (as with the 3/2 example). The value of PCLKENT 1070 indicates when data may be transferred from the domain of PCLK 415 to the domain of SCLK 475. The values used are different in the 4/3 case because each coloring value is selectively used based on combinations which provide the best timing for transfers. As a result, the coloring codes might differ from one case to the next. However, as discussed before, the logic only needs to be designed once.

The setup time for transferring the data contained in TREG 1110 is shown by a corresponding tSu in FIG. 13. For example, tSU 1310 is the setup time for transferring T4 from the domain of PCLK 415 to the domain of SCLK 475. As shown, in the 4/3 example, the time available for data transport from the domain of PCLK 415 to SCLK 475 is one cycle of SCLK 475, 1/2 cycle of SCLK 475, and one cycle of PCLK 415 (for T4, T5, and T6, respectively). The second transport slot (T5) has the least amount of setup time.

Figure 14:
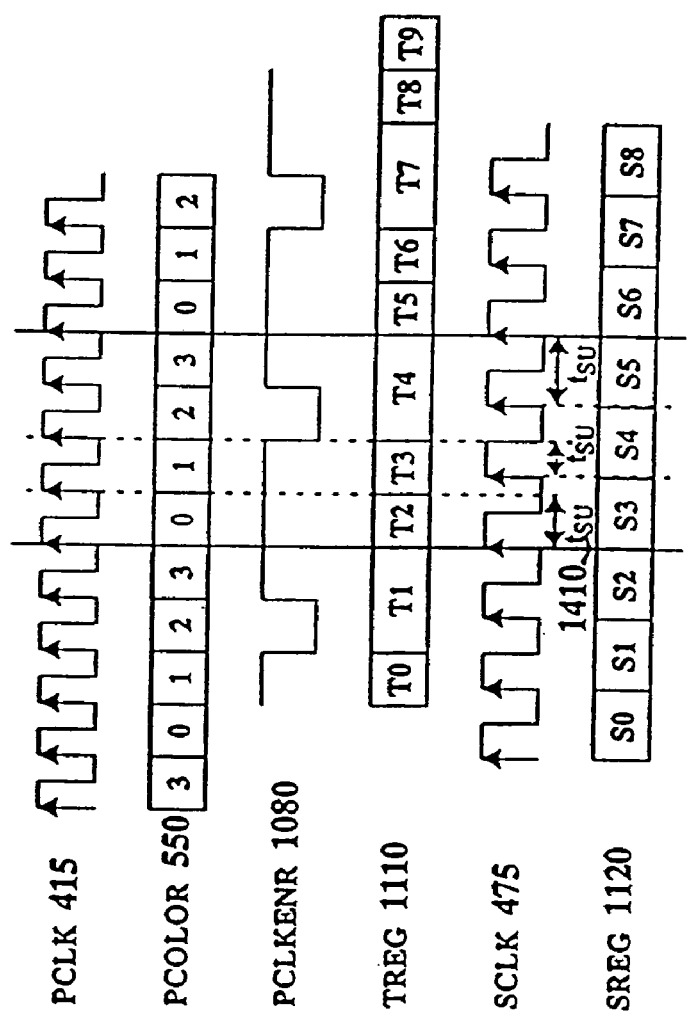
FIG. 14 shows a timing diagram for transfers in the read direction for a 4/3 gear ratio example.

FIG. 14 shows a timing diagram for transfers from the domain of SCLK 475 to the domain of PCLK 415, using a 4/3 gear ratio. In FIG. 14, PCOLOR 550 cycles through four values (i.e., 000, 001, 010, and 011). For PCLKENR 1080, the value 010 of PCOLOR 550 is not used (which differs from the 3/2 example). The value of PCLKENR 1080 indicates when data may be transferred from the domain of SCLK 475 to the domain of PCLK 415. The values used are different in the 4/3 case because each coloring value is selectively used based on combinations which provide the best timing for transfers. As a result, the coloring codes might differ from one case to the next. However, as discussed before, the logic only needs to be designed once.

The setup time for transfer of the data contained in SREG 1120 is shown by a corresponding tSu in FIG. 14. For example, tsU 1410 is the setup time for transferring S3 from the domain of SCLK 475 to the domain of PCLK 415. As shown, in the 4/3 example, the time available for data transport from the domain of SCLK 475 to PCLK 415 is one cycle of PCLK 415, 1/2 cycle of SCLK 475, and one cycle of SCLK 475 (for S3, S4, and S5, respectively). Again, the second transport slot (S4) has the least amount of setup time.

Figure 15:
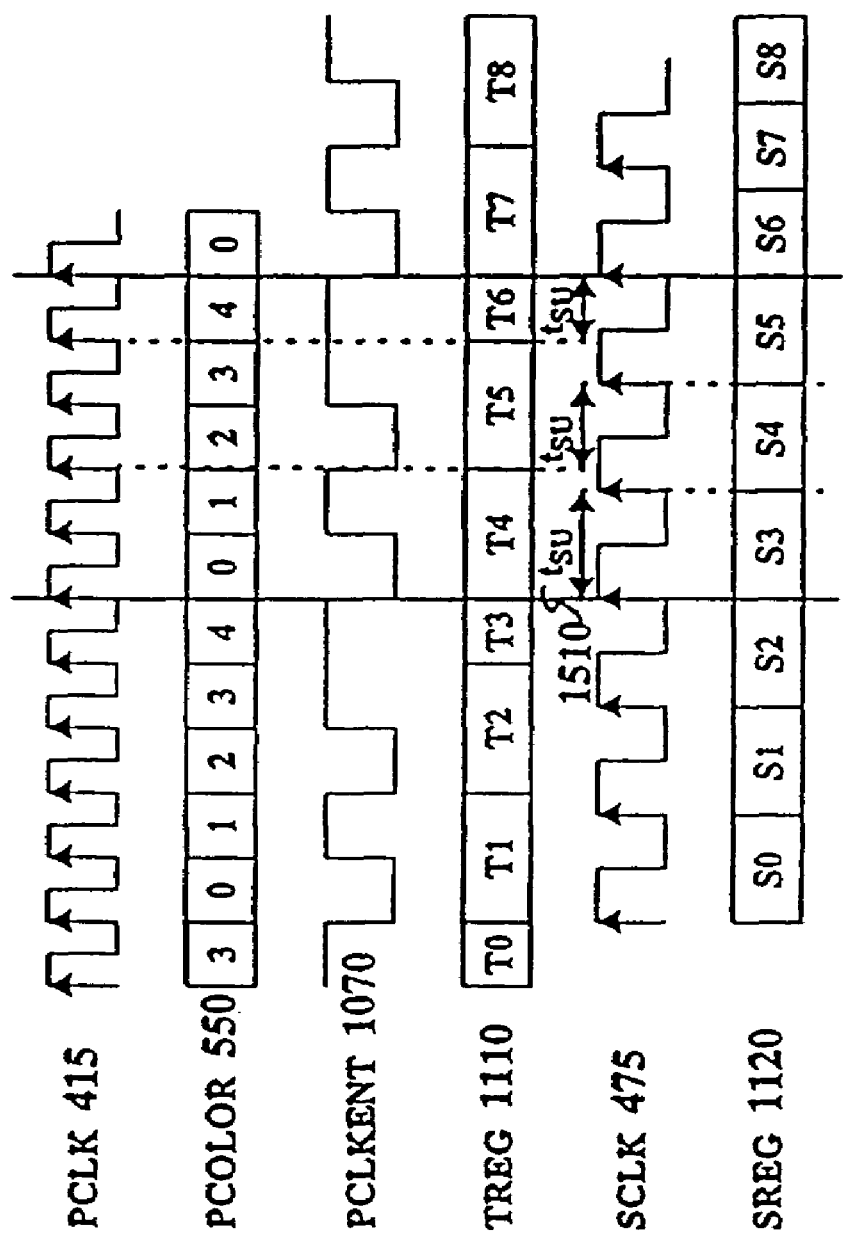
FIG. 15 shows a timing diagram for transfers in the write direction for a 5/3 gear ratio example.

FIG. 15 shows a timing diagram for transfers from the domain of PCLK 415 to the domain of SCLK 475, using a 5/3 gear ratio. In FIG. 15, PCOLOR 550 cycles through five values (i.e., 000, 001, 010, 011, and 100). For PCLKENT 1070, the values 000 and 010 of PCOLOR 550 are not used. Again, the value of PCLKENT 1070 indicates when data may be transferred from the domain of PCLK 415 to the domain of SCLK 475. The values used are different in the 5/3 case because each coloring value is selectively used based on combinations which provide the best timing for transfers. As a result, the coloring codes might differ from one case to the next. However, as discussed before, the logic only needs to be designed once.

The setup time for transfer of the data contained in TREG 1110 is shown by a corresponding tSu in FIG. 15. For example, tSu 1510 is the setup time for transferring T4 from the domain of PCLK 415 to the domain of SCLK 475.l As shown, in the 5/3 example, the time available for data transport from the domain of PCLK 415 to SCLK 475 is one cycle of SCLK 475, one cycle of SCLK 475, 4/5 cycle of SCLK 475, and one cycle of PCLK 415 (for T4, T5, and T6, respectively). The third transport slot (T6) has the least amount of setup time in this example.

Figure 16:
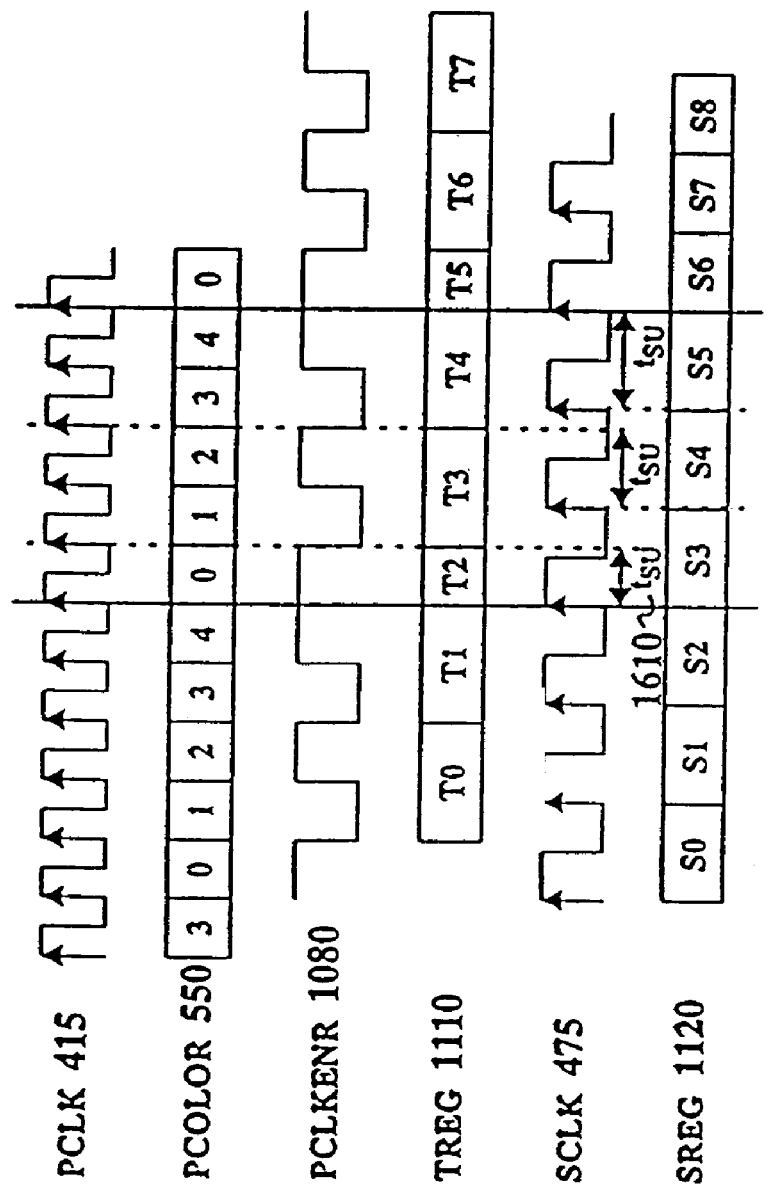
FIG. 16 shows a timing diagram for transfers in the read direction for a 5/3 gear ratio example.

FIG. 16 shows a timing diagram for transfers from the domain of SCLK 475 to the domain of PCLK 415, using a 5/3 gear ratio. In FIG. 16, PCOLOR 550 cycles through five values (i.e., 000, 001, 010, 011, and 100). For PCLKENR 1080, the values 001 and 011 of PCOLOR 550 are not used. The value of PCLKENR 1080 indicates when data may be transferred from the domain of SCLK 475 to the domain of PCLK 415. The values used are different in the 5/3 case because each coloring value is selectively used based on combinations which provide the best timing for transfers. As a result, the coloring codes might differ from one case to the next. However, as discussed before, the logic only needs to be designed once.

The setup time for transfer of the data contained in SREG 1120 is shown by a corresponding tSU in FIG. 16. For example, tSU 1610 is the setup time for transferring S3 from the domain of SCLK 475 to the domain of PCLK 415. As shown, in the 5/3 example, the time available for data transport from the domain of SCLK 475 to PCLK 415 is one cycle of PCLK 415, 4/5 cycle of SCLK 475, and one cycle of SCLK 475 (for S3, S4, and S5, respectively). The first transport slot (S3) has the least amount of setup time.

As shown in FIGS. 13 through 16, the timing margins are better for a 5/3 gear ratio than for a 4/3 gear ratio, even though PCLK 415 is running relatively faster than SCLK 475.

In general, even if two clocks are related by a gear ratio, there is no inherent phase relationship between the clocks. This being the case, their clock edges may never be aligned. As previously discussed, if some method exists to align one rising edge of SCLK 415 to one of the rising edges of PCLK 475, then a synchronized phase relationship, such as shown in FIG. 3, can be achieved.

Therefore, there are known time periods when data transactions are allowed in a gear ratio system, as well as known periods of time when transactions are not allowed. As a practical matter, since memory components (in the domain of SCLK 475) are generally slower than the other components in the domain of PCLK 415, during the periods when data transactions are allowed, larger than required blocks of data can be transferred in order to keep the logic in the domain of SCLK 475 active during the cycles when data transfer is not allowed. Therefore, for optimization purposes, the components in the domain of SCLK 475 may need to be kept active even when no data is arriving from the domain of PCLK 415.

Figure 17:
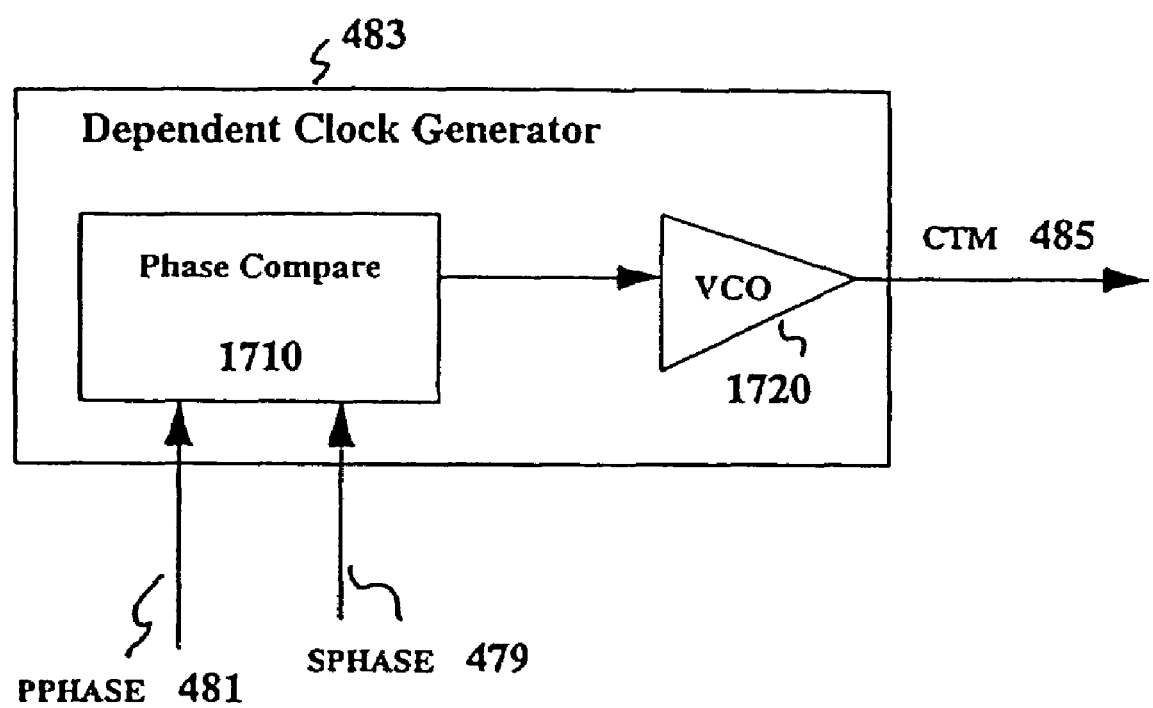
FIG. 17 is a block diagram of an equivalent circuit for a Dependent Clock Generator.

FIG. 17 shows an equivalent circuit for Dependent Clock Generator 483 of FIG. 4. Gear ratio Logic 477 of FIG. 4 develops PPHASE 481 and SPHASE 479 which are compared by phase comparator 1710. Phase comparator 1710, in turn, drives a voltage controlled oscillator (VCO) 1720. VCO 1720 provides CTM 485 which effectively becomes SCLK 475, as shown in FIG. 4.

Figure 18A:
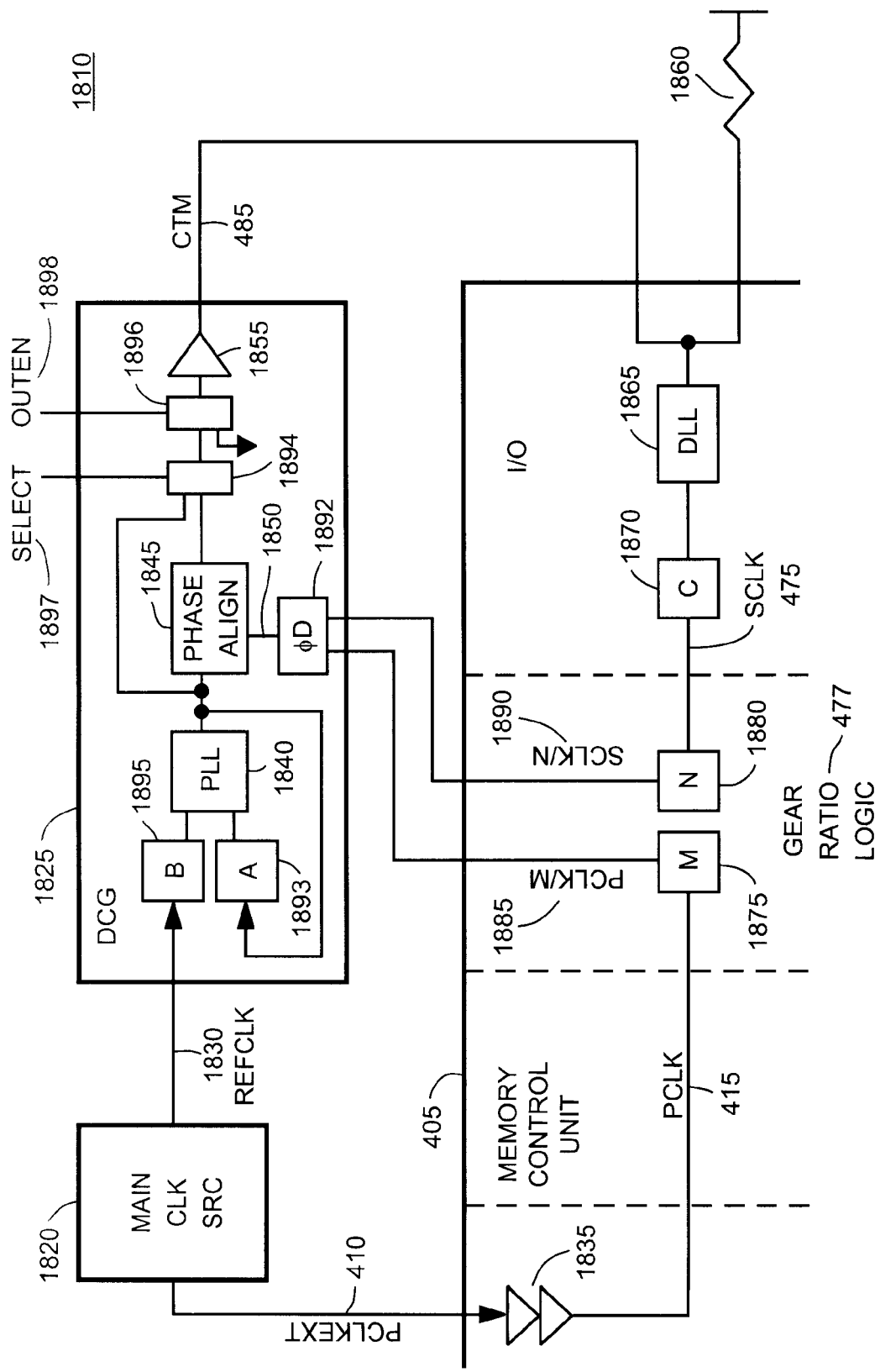
FIGS. 18A and 18B are block diagrams of a Distributed Clock Generator Loop.
Figure 18B:
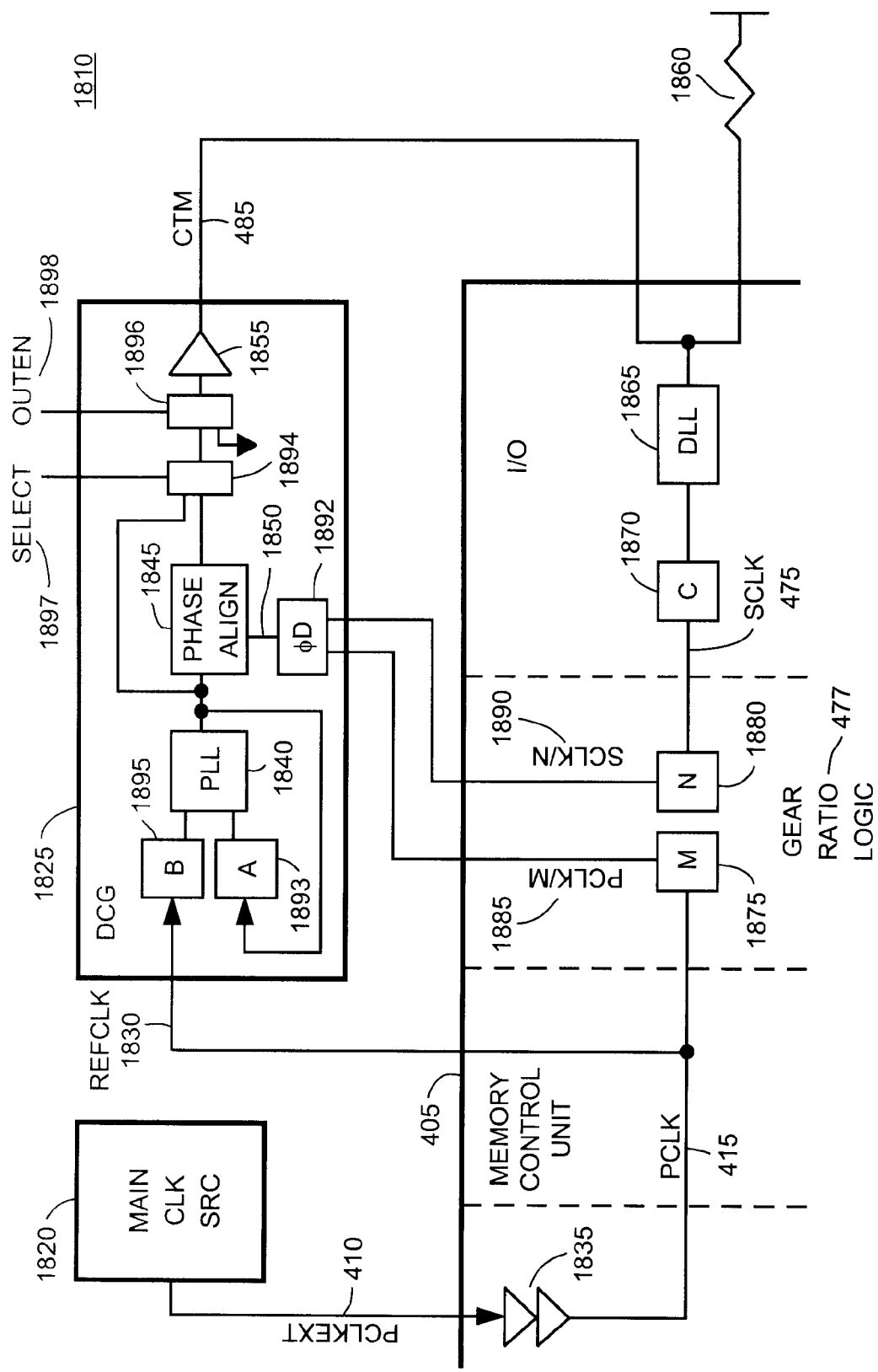

FIGS. 18A and 18B show a distributed clock generator Loop 1810 which is an alternative equivalent circuit for Dependent Clock Generator 483 of FIG. 4. The architecture contains a clock source 1820, a distributed clock generator (DCG) 1825, and Memory Control Unit 405 with logic running in two clock domains, PCLK 415 and SCLK 475.

In one embodiment, clock source 1820 in FIG. 18A or 18B generates all of the clock frequencies required by the system, including PCLKEXT 410 for Memory Control Unit 405 and a reference clock for the distributed loop, REFCLK 1830. However, this is only one embodiment and REFCLK 1830 could be generated by a different clock source than PCLKEXT 410.

In the general case, PCLKEXT 410 and REFCLK 1830 could be different frequencies or the same frequency, or even could be combined into one signal (see FIG. 18B). Also, REFCLK 1830 could be completely derived from a different clock source than PCLKEXT 410. PCLKEXT 410 is buffered inside Memory Control Unit 405 by buffers 1835 to generate PCLK 415. Alternately, PCLKEXT 410 could be divided down or multiplied up to generate PCLK 415. But, the control logic that runs Memory Control Unit 405 is generally all in the domain of PCLK 415.

DCG 1825 receives REFCLK 1830. REFCLK 1830 is multiplied by utilizing clock dividers, 1893 and 1895, and a phase-locked loop (PLL) 1840 to generate a higher frequency clock. No specific type of PLL design is required for the distributed clock loop. One of skill in the art would understand that any one of a number of PLL designs of the prior art may be employed. The output of PLL 1840 is passed to a phase aligner 1845. No specific type of phase aligner design is required for the distributed clock loop. One of skill in the art would understand that any one of a number of phase aligner designs of the prior art may be employed.

As a result, the output frequency of phase aligner 1845 is the same as its input frequency, but the output phase is delayed from the input phase by an amount determined by a control input 1850. The output of phase aligner 1845 is buffered by an output driver 1855 and driven out of DCG 1825 as signal CTM 485. In general, CTM could be any type of clock signal including a small-swing differential clock or a single-ended CMOS-level clock.

In FIGS. 18A and 18B, CTM 485 is shown traveling down a transmission line past Memory Control Unit 405 to a termination resistor 1860. The use of terminated transmission lines is common practice in high-speed clock distribution, but is not a requirement for the distributed clock loop. In FIGS. 18A and 18B, CTM 485 is passed to a delay locked loop (DLL) block 1865 inside the I/O section of Memory Control Unit 405. DLL 1865 is used to remove skew from clock signals distributed within the I/O circuitry. The use of DLLs inside controllers is preferable but not a requirement for the distributed clock loop architecture.

Finally, the output of DLL 1865 drives a clock divider, C 1870, which divides CTM 485 to generate SCLK 475. A common value for the divider C would be four, but C could be any value including one (i.e., SCLK=CTM). In FIG. 18, all of the logic on the inside portion of the I/O section of Memory Control Unit 405 runs in the same domain of SCLK 475.

Also in FIGS. 18A and 18B, there are two clock dividers in the gear ratio Logic, M 1875 and N 1880. Clock divider 1875 divides PCLK 415 to generate $PCLK_{13}$ M 1885, and clock divider 1880 divides SCLK 475 to generate $SCLK_{13}$ N 1890. The two divided clocks, $PCLK_{13}$ M 1885 and $SCLK_{13}$ N 1890, are output from Memory Control Unit 405 and passed back to DCG 1825 as inputs to a phase detector 1892. In one embodiment, $PCLK_{13}$ M 1885 and $SCLK_{13}$ N 1890 may need to be carefully matched since they are routed between chips and may introduce timing skew between PCLK 415 and SCLK 475.

Phase detector 1892 compares the relative phases of PCLK_M 1885 and SCLK_N 1890, and outputs an error signal on 1850. PCLK_M 1885 and SCLK_N 1890 may be substituted for PPHASE 481 and SPHASE 479 of FIG. 4, respectively. Output 1850 could be either a proportional error signal (indicating the amount of error) or a simple early/late signal (i.e., a bang-bang loop). Phase detector output 1850 drives phase aligner 1845 to either increase or decrease its delay. When the output phase of phase aligner 1845 changes, the phase of CTM 485 will have the same amount of phase change. The phase of SCLK 475 also will have the same phase change, and eventually the phase of SCLK_N 1890 will follow. Thus, phase detector 1892 drives phase aligner 1845 to adjust the phase of SCLK_N 1890 until it matches the phase of PCLK_M 1885, and the phase error is minimized.

FIG. 18A shows one embodiment of the distributed clock generation loop. Other arrangements of the blocks of the distributed loop are possible. For example, phase detector 1892 could be placed in Memory Control Unit 405 instead of in DCG 1825. Optionally, PLL 1840 may be omitted from DCG 1825 if not required. As mentioned previously, DLL 1865 and divider C 1870 may be omitted from the I/O portion of Memory Control Unit 405 if not required, or placed outside of Memory Control Unit 405. The other clock buffers such as 1835 are also optional. The M and N dividers, 1875 and 1880, respectively, could have any divisor including one. A 1/1 gear ratio could be formed by using M=N=2 if the frequencies of PCLK 415 and SCLK 475 were equal. As discussed before with respect to FIG. 5, the values of M and N are double the values of PCTL+1 and SCTL+1, respectively. However, an effective 1/1 gear ratio could also be formed by using M=N=4. This would still keep $PCLK_{13}$ M 1885 equal to $SCLK_{13}$ N 1890 but would lower the frequency of the divided-down clock signals. The lower frequency might be helpful for the best phase detection performance by phase detector 1892. Also, because of the feedback loop, a higher frequency of $PCLK_{13}$ M 1885 and $SCLK_{13}$ N 1890 will generate a quicker response from the feedback loop and may result in more jitter in the circuit, for example.

In FIG. 18A, there are also two additional clock dividers, A 1893 and B 1895, coupled to the inputs of PLL 1840. Clock divider 1895 divides REFCLK 1830 by B, and clock divider 1893 divides the output of PLL 1840 by A before it is fed back to the input of PLL 1840. These clock dividers will force PLL 1840 to multiply the frequency of REFCLK 1830 by the ratio A/B, so that the PLL output clock will equal REFCLK*A/B. The frequency of CTM 485 is the same as the output frequency of PLL 1840 because phase aligner 1845 does not affect the clock frequency (only phase).

Also, the input of phase detector 1892, SCLK_N 1890, is divided from CTM 485 by dividers 1870 and 1880. Therefore, SCLK_N 1880 is related to REFCLK 1830 by the following relationship:

$SCLK\_N = REFCLK*A/(B*C*N)$

For example, if REFCLK 1830 is 50 MHz, and if dividers 1870, 1880, 1893 and 1895 are set such that A=8, B=1, C=4, and N=4, then SCLK_N 1890 will be 25 MHz. Some other examples of frequencies for PCLK 415 and REFCLK 1830, with various combinations of dividers for A 1893, B 1895, M 1875, and N 1880, and the resulting frequencies for CTM 485 and SCLK 475 are shown in Table 1. The values in Table 1 have been rounded off. The value of C is kept at 4 for all cases shown. The column labeled "F@PD" gives the frequency into phase detector 1892, which is the frequency for both PCLK_M 1885 and SCLK_N 1890.

TABLE 1

| PCLK (MHz) | REF-CLK (MHz) | CTM (MHz) | SCLK (MHz) | A | B | M | N | Gear Ratio | F @ PD (MHz) |
|---|---|---|---|---|---|---|---|---|---|
| 67 | 33 | 267 | 67 | 8 | 1 | 2 | 2 | 1/1 | 33 |
| 100 | 50 | 300 | 75 | 6 | 1 | 8 | 6 | 4/3 | 12.5 |
| 100 | 50 | 400 | 100 | 8 | 1 | 4 | 4 | 2/2 | 25 |
| 125 | 50 | 300 | 75 | 6 | 1 | 10 | 6 | 5/3 | 12.5 |
| 133 | 67 | 267 | 67 | 4 | 1 | 4 | 2 | 2/1 | 33 |

TABLE 1-continued

| PCLK (MHz) | REF-CLK (MHz) | CTM (MHz) | SCLK (MHz) | A | B | M | N | Gear Ratio | F @ PD (MHz) |
|---|---|---|---|---|---|---|---|---|---|
| 133 | 133 | 356 | 89 | 8 | 3 | 6 | 4 | 3/2 | 22 |
| 133 | 67 | 400 | 100 | 6 | 1 | 8 | 6 | 4/3 | 16.7 |
| 150 | 150 | 400 | 100 | 8 | 3 | 6 | 4 | 3/2 | 25 |
| 200 | 100 | 400 | 100 | 4 | 1 | 8 | 4 | 4/2 | 25 |

In one example, a single oscillator, MAIN CLK SRC 1820, is divided one way to create a high frequency clock, PCLK 415, for Memory Control Unit 405, and is divided another way to create a reference clock, REFCLK 1830, for the memory subsystem. If a fast memory system clock of, say, 400 MHz is desired for the memory bus transfers, a slower clock for generating an accurate phase detector output 1850 and data enable signals may be needed, so the 400 MHz is divided by C=4 to generate a 100 MHz SCLK clock.

The M and N dividers, 1875 and 1880, select a frequency into which both PCLK 415 and SCLK 475 are divisible. In the example of FIGS. 9 and 11, M=6 and N=4 results in two signals PPHASE 481 and SPHASE 479 with the common frequency. These can then be aligned in phase aligner 1845.

It is desirable to be able to turn off the clock drive lines and their capacitive loads to reduce power consumption. But this would normally lose frequency and phase lock on the clock, requiring a long latency for reacquiring lock when coming out of a low power state. The invention provides a way to maintain frequency lock, and only require phase lock when coming out of a low power state. This is done by creating a separate frequency lock with PLL 1840. Thus, when the feedback loop to phase aligner 1845 is turned off in low power, frequency lock at the desired common frequency corresponding to the M and N values, with the C divider factored in, is maintained with PLL 1840 and dividers 1875 and 1880.

Also shown in FIG. 18A are two output multiplexers 1894 and 1896. Output multiplexer 1894 selects between the output of PLL 1840 and the output of phase aligner 1845 under control of a select signal SELECT 1897. Selecting the output of phase aligner 1845 is the normal mode of operation of the distributed loop. However, selecting the output of PLL 1840 bypasses phase aligner 1845 and disables the distributed loop. This mode would be useful, for example, for testing the output of PLL 1840 directly.

Output multiplexer 1896 in FIG. 18A enables output driver 1855 under the control of an output enable signal OUTEN 1898. The output of driver 1855 is enabled by output multiplexer 1896 in the normal mode of operation of the distributed loop. The OUTEN 1898 signal can disable the output either by switching the output to drive a low logic level (as shown) or by switching the output into a high-impedance state. When the output is disabled, no power is dissipated in the output driver stage, and significant power is saved. This feature of the present invention will be, for example, very helpful in portable applications where the reduction of power consumption is highly desirable. This also enables the distributed loop to avoid frequency and phase drifts for a low-latency startup, while eliminating the power drain of driving the capacitive load on the clock line of CTM 485.

Moreover, traditional PLLs have long acquisition and settling times. If the feedback loop is broken in a traditional PLL (for example, by disabling the clock signal), the output clock frequency would drift significantly from the locked condition and significant time would be required to re-lock the loop. For example, a traditional PLL might require 10 microseconds to re-lock the loop if the feedback clock were disabled. However, for the distributed clock generation loop shown in FIG. 18A, the feedback clock to divider 1893 is not broken when the output clock is disabled at multiplexer 1896 because the output of PLL 1840 is still fed back to divider 1893. Therefore, there is no clock frequency drift when the output clock is disabled and the delay is therefore less when the output is enabled again.

Furthermore, phase aligners have a much shorter acquisition and settling times than traditional PLLs. Since the phase aligner block only adjusts the phase and does not affect the clock frequency, there is no clock frequency or phase drifts when the output clock is disabled. Therefore, when the output clock is re-enabled by multiplexer 1896, signals 1890 and 1885 at the inputs to phase detectors 1892 will return to their previously locked state relatively quickly. For example, the output clock from the distributed DLL loop might settle in less than 10 nanoseconds (or a few clock cycles), as compared to 10 microseconds for the traditional PLL.

Figure 19A:
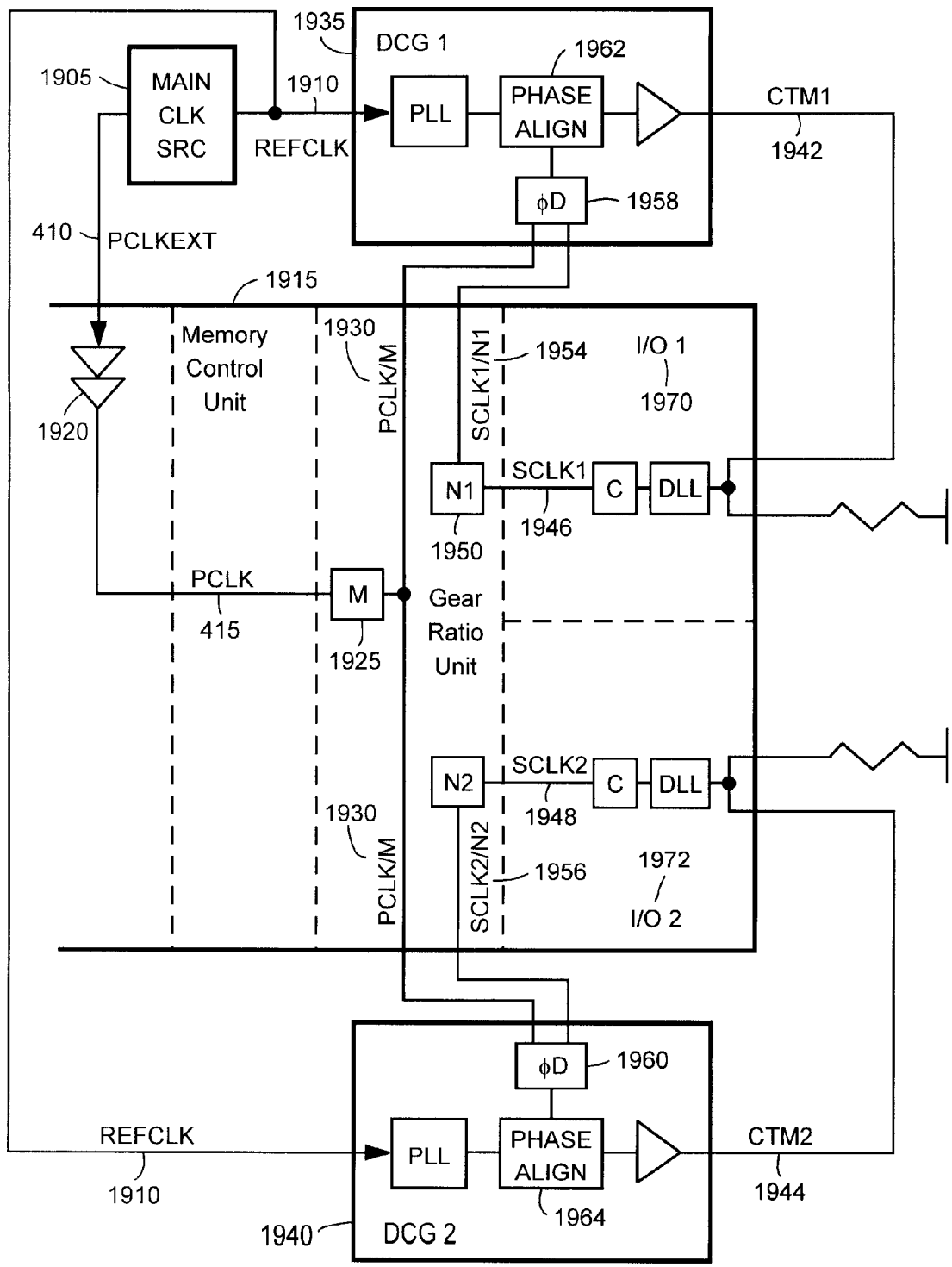
FIGS. 19A and 19B are block diagrams of an alternative Distributed Clock Generator Loop applied to multiple clock domains.
Figure 19B:
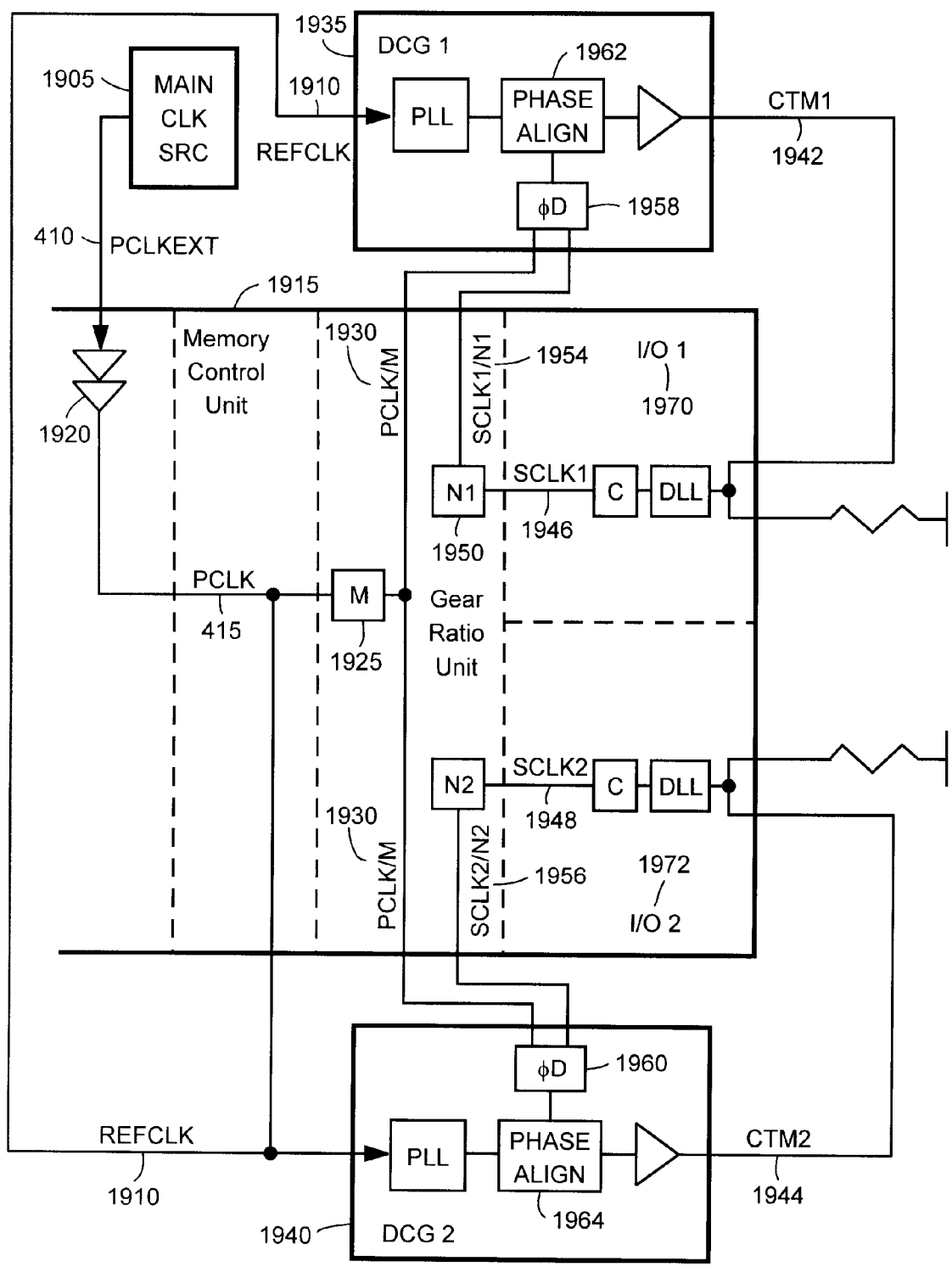

FIGS. 19A and 19B show how the distributed clock architecture could be applied to a system in order to interface a single clock domain with multiple clock domains. Elements appearing in FIGS. 19A and 19B which were introduced in previous figures are referred to with the same reference numerals which were originally used.

In one embodiment, clock source 1905, in FIG. 19A, generates all of the clock frequencies required by the system, including PCLKEXT 410 for Memory Control Unit 1915 and a reference clock for the distributed loop, REFCLK 1910. However, this is only one embodiment and REFCLK 1910 could be generated by a different clock source than PCLKEXT 410.

PCLKEXT 410 is buffered by buffers 1920 to produce PCLK 415, which is divided by M when it passes through divider 1925 to produce PCLK$_{13}$ M 1930. But, in FIGS. 19A and 19B, REFCLK 1910 is routed to two DCG blocks 1935 and 1940, each of which produce corresponding output clocks, CTM1 1942 and CTM2 1944, which in turn generate corresponding I/O output clocks, SCLK1 1946 and SCLK2 1948. These clocks are fed to their corresponding dividers, N1 1950 and N2 1952, to produce two clocks, SCLK1$_{13}$ N1 1954 and SCLK2$_{13}$ N2 1956, for two loop phase detectors 1958 and 1960, respectively.

In principle, the two N dividers could have different values, and the two distributed loops could run at different frequencies. For example, it would be possible to have PCLK=100 MHz, SCLK1=75 MHz, and SCLK2=100 MHz. However, in most practical applications, the frequencies of SCLK1 1946 and SCLK2 1948 would be identical, and the dividers N1 1950 and N2 1952 would have the same value (i.e., N1=N2).

In FIGS. 19A and 19B, phase detectors 1958 and 1960 drive their respective phase aligners 1962 and 1964 to shift the phase of their corresponding SCLKs until both SCLK1$_{13}$ N1 1945 and SCLK2$_{13}$ N2 1956 are aligned with PCLK$_{13}$ M 1930. When these two loops are independently aligned, the control logic in the domain of PCLK 415 can talk to both of the I/O clock domains 1970 and 1972 simultaneously using the gear ratio technique discussed previously. In this manner, distributed clock loops can be used to generate the clocks required to allow asynchronous data transfers across multiple clock domains (i.e., two or more) with minimized latency. Also, multiple clock domains allows some to be turned-off to save power if only part of the memory is being used.

In conclusion, methods and circuitry are disclosed for applying gear ratio techniques to allow data exchange between different clock domains with minimal latency. Also, methods and circuitry are disclosed for a distributed clock generation loop which generates clocks required to allow asynchronous data transfers with minimized latency.

While the above is a complete description of the preferred embodiments of the invention, various alternatives, modifications, and equivalents may be utilized. For example, the disclosed techniques could be used to simultaneously synchronize multiple clock domains to a principal clock domain. Also, the use of the distributed clock generation loop of the present invention is not limited to memory subsystems, and could be applied to other applications which require data transmission between multiple clock domains. Therefore, the above description should not be taken as limiting the scope of the invention which is defined by the appended claims.

What is claimed is:

1. A system comprising:
 a frequency synthesis loop circuit to receive a reference clock signal, the frequency synthesis loop to generate an internal clock signal having a frequency that includes a predetermined relationship to a frequency of the reference clock signal; and
 a phase alignment circuit to receive the internal clock signal, a first clock signal, and a second clock signal, the phase alignment circuit to detect a phase difference between the first clock signal and the second clock signal and to generate an output clock signal that is phase-shifted with respect to the internal clock signal such that the output clock signal is phase shifted in accordance with the phase difference between the first clock signal and the second clock signal.

2. The system of claim 1 further comprising a clock synchronizing circuit including a gear ratio logic circuit configured to receive the reference clock signal and the output clock signal, the gear ratio logic circuit to generate the first clock signal from the reference clock signal such that the frequency of the first clock signal is a first fraction of the frequency of the reference clock signal, the gear ratio logic circuit to generate the second clock signal from the output clock signal such that the frequency of the second clock signal is a second fraction of the frequency of the output clock signal, the phase alignment circuit to phase-shift the output clock signal such that a detected phase difference between the first and second clocks is substantially zero.

3. The system of claim 1 wherein the output clock signal includes a frequency that is the same as a frequency of the internal clock signal, and wherein the frequency of the reference clock signal is constant.

4. The system of claim 1 wherein the phase alignment circuit is configured to phase-shift the output clock signal such that a detected phase difference between the first clock signal and the second clock signal is substantially zero, wherein the system further includes:
 a clock source to generate the reference clock signal;
 gear ratio logic circuitry to receive the reference clock signal and the output clock signal and to generate the first clock signal from the reference clock signal, the frequency of the first clock signal being a first fraction of the frequency of the reference clock signal, the gear ratio logic circuitry configured to generate the second clock from the output clock signal, the frequency of the second clock being a second fraction of the frequency of the output clock signal, wherein the gear ratio logic circuitry is configured to generate a transfer enable signal based on the reference and output clock signals;
 a first circuit configured to operate in a first clock domain in response to the output clock signal; and
 a second circuit configured to operate in a second clock domain in response to the reference clock and to receive the transfer enable signal.

5. The system of claim 1 further including:
 a memory device;
 a memory controller, coupled to the memory device, the memory controller including:
 a first circuit to receive data from the memory device in response to the output clock signal; and
 a second circuit to receive the data from the first circuit in response to the reference clock signal.

6. The system of claim 1, further including a multiplexer coupled to the phase alignment circuit and the frequency synthesis loop, the multiplexer to selectively disable the phase alignment circuit.

7. The system of claim 1, wherein the frequency synthesis loop is further configured to divide the reference clock signal by a constant.

8. The system of claim 1, wherein the frequency synthesis loop is further configured to multiply the reference clock signal by a constant.

9. The system of claim 1, further including a switching device coupled to the phase alignment circuit and the frequency synthesis loop, the switching device configured to selectively disable the output clock signal.

10. The system of claim 9, wherein the switching device further includes a multiplexer coupled to the phase alignment circuit and the frequency synthesis loop, the multiplexer configured to selectively disable distribustion of an output from the phase alignment circuit.

11. The system of claim 1, wherein the frequency synthesis loop circuit and the phase alignment circuit are incorporated inside a memory control unit.

12. A system comprising:
 gear ratio logic circuitry to receive a reference clock signal, a first output clock signal and a second output clock signal, the gear ratio logic circuitry to generate:
 a first gear ratio output clock from the reference clock signal, the first gear ratio output clock signal having a frequency that is a first fraction of the frequency of the reference clock signal;
 a second gear ratio output clock from the first output clock signal, the second gear ratio output clock having a frequency that is a second fraction of the frequency of the first output clock signal;
 a third gear ratio output clock from the second output clock signal, the third gear ratio output clock having a frequency that is a third fraction of the frequency of the second output clock signal;
 a first clock generator to generate the first output clock signal, the first clock generator including phase alignment circuitry to phase shift the first output clock signal such that a detected phase difference between the first and second gear ratio output clocks is substantially zero; and
 a second clock generator to generate the second output clock signal, the second clock generator including phase alignment circuitry to phase shift the second output clock signal such that a detected phase difference between the first and third gear ratio output clocks is substantially zero.

13. The system of claim 12, further comprising:
a first circuit to operate using the reference clock signal, wherein the gear ratio logic circuitry is configured to generate a first transfer enable signal based on the reference clock signal and first output clock signal, the first circuit to receive the first transfer enable signal;
a second circuit to operate using the first output clock signal, wherein the gear ratio logic circuitry is configured to generate a second transfer enable signal based on the reference clock signal and second output clock signal, the second circuit configured to receive the second transfer enable signal; and
a third circuit to operate using the second output clock signal.

14. A system comprising:
a first circuit to receive a reference clock signal, wherein the first circuit operates synchronously with respect to the reference clock signal;
a second circuit to receive a first clock signal that has a period that is an integer multiple of a period of the reference clock signal and having a predetermined phase relationship with the reference clock signal; and
a gear ratio logic circuit coupled to the first circuit and the second circuit, the gear ratio logic circuit to receive the reference clock signal and the first clock signal and to generate a transfer enable signal based on the reference and first clock, the transfer enable signal to synchronize information transfers between the first circuit and the second circuit.

15. The system of claim 14, wherein the first circuit and the second circuit are embedded in a memory control unit.

16. The system of claim 15, further including a memory device, coupled to the memory control unit, the memory control unit to control an operation of the memory device, wherein the memory device receives the first clock signal and provides data to the memory control unit, wherein the data includes a predetermined timing relationship with the first clock signal.

17. The system of claim 15, further comprising a central processing unit, coupled to the memory control unit, the central processing unit configured to operate in a clock domain of the reference clock signal such that the information transfers synchronize transfer of the data from a clock domain of the first clock signal to the clock domain of the reference clock signal.

18. The system of claim 14, further including a clock generator circuit to adjust a phase of the first clock signal in response to a phase difference between the reference clock signal and the first clock signal.

19. The system of claim 14, further including a register to store a value that represents a ratio between the period of the reference clock signal and the period of the first clock signal.

20. An integrated circuit device comprising:
a first circuit to receive a reference clock signal, wherein the first circuit operates synchronously with respect to the reference clock signal;
a second circuit to receive a first clock signal that has a period that is an integer multiple of a period of the reference clock signal, the first clock signal having a predetermined phase relationship with the reference clock signal; and
a gear ratio logic circuit coupled to the first circuit and the second circuit, the gear ratio logic circuit to receive the reference clock signal and the first clock signal and to generate a transfer enable signal based on the reference clock signal and the first clock signal, the transfer enable signal to synchronize information transfers between the first circuit and the second circuit.

21. The integrated circuit device of claim 20, further including a register to store a value that represents a ratio between the period of the reference clock signal and the period of the first clock signal.

* * * * *